United States Patent [19]

Fukui et al.

[11] Patent Number: 5,206,686
[45] Date of Patent: Apr. 27, 1993

[54] APPARATUS FOR FORMING AN IMAGE WITH USE OF ELECTROPHOTOGRAPHIC PROCESS INCLUDING GRADATION CORRECTION

[75] Inventors: Kazuyuki Fukui, Toyohashi; Takanobu Yamada, Toyokawa; Masaaki Nishiyama, Toyohashi, all of Japan

[73] Assignee: Minolta Camera Kabushiki Kaisha, Osaka, Japan

[21] Appl. No.: 671,977

[22] Filed: Mar. 19, 1991

[30] Foreign Application Priority Data

| Mar. 20, 1990 | [JP] | Japan | 2-071410 |
| Mar. 20, 1990 | [JP] | Japan | 2-071411 |
| Mar. 20, 1990 | [JP] | Japan | 2-071412 |
| Mar. 20, 1990 | [JP] | Japan | 2-071413 |
| Mar. 20, 1990 | [JP] | Japan | 2-071414 |
| Mar. 20, 1990 | [JP] | Japan | 2-071415 |
| Mar. 20, 1990 | [JP] | Japan | 2-071416 |

[51] Int. Cl.$^5$ .................................. G03G 21/00
[52] U.S. Cl. ........................... 355/208; 355/246; 358/406
[58] Field of Search ............... 355/245, 246, 326, 327, 355/200, 202, 203, 204, 208, 210, 219, 228, 265, 214; 346/160; 358/75, 80, 406, 448, 458, 461, 475

[56] References Cited

U.S. PATENT DOCUMENTS

| 4,226,525 | 10/1980 | Sakamoto et al. |
| 4,277,162 | 7/1981 | Kasahara et al. |
| 4,367,944 | 1/1983 | Kuru . |
| 4,583,834 | 4/1986 | Seko et al. |
| 4,627,712 | 12/1986 | Usami . |
| 4,647,184 | 3/1987 | Russell et al. ..................... 355/208 |
| 4,647,950 | 3/1987 | Nosaki et al. |
| 4,674,861 | 6/1987 | Kawamura . |
| 4,679,057 | 7/1987 | Hamada . |
| 4,717,964 | 1/1988 | Abe et al. |
| 4,728,989 | 3/1988 | Ohmori . |
| 4,763,199 | 8/1988 | Suzuki . |
| 4,782,398 | 11/1988 | Mita . |
| 4,800,442 | 1/1989 | Riseman . |
| 4,814,886 | 3/1989 | Kuge et al. |
| 4,816,924 | 3/1989 | Sekiya . |
| 4,864,419 | 9/1989 | Saito et al. |
| 4,873,428 | 10/1989 | Takeuchi et al. |
| 4,894,685 | 1/1990 | Shoji ..................... 355/246 |
| 4,903,123 | 2/1990 | Kawamura et al. |
| 4,914,459 | 4/1990 | Mama et al. |
| 4,924,301 | 5/1990 | Surbrook . |
| 4,933,776 | 6/1990 | Ikeda . |
| 4,958,221 | 9/1990 | Tsuboi et al. ..................... 358/80 |
| 4,958,239 | 9/1990 | Yamada et al. |
| 4,959,687 | 9/1990 | Katoh et al. ..................... 355/214 |
| 4,990,957 | 2/1991 | Nakanishi et al. ..................... 355/228 |

FOREIGN PATENT DOCUMENTS

| 51-33635 | 3/1976 | Japan . |
| 53-115233 | 10/1978 | Japan . |
| 53-116157 | 10/1978 | Japan . |
| 53-136838 | 11/1978 | Japan . |
| 55-15169 | 2/1980 | Japan . |
| 55-29869 | 3/1980 | Japan . |
| 57-76977 | 5/1982 | Japan . |
| 59-140647 | 8/1984 | Japan . |
| 59-161982 | 9/1984 | Japan . |
| 61-61566 | 3/1986 | Japan . |
| 61-94070 | 5/1986 | Japan . |
| 61-118069 | 6/1986 | Japan . |
| 61-214666 | 9/1986 | Japan . |
| 63-296062 | 12/1988 | Japan . |
| 1-196347 | 8/1989 | Japan . |
| 2145598A | 3/1985 | United Kingdom . |

Primary Examiner—A. T. Grimley
Assistant Examiner—Sandra L. Brasé
Attorney, Agent, or Firm—Burns, Doane, Swecker & Mathis

[57] ABSTRACT

An apparatus such as a digital printer for forming a image with use of electrophotographic process with a reversal development system, the density is controlled automatically by varying the sensitizing electric potential $V_O$ of the photoconductor and the bias electric voltage $V_B$ of the development unit according to the detected density of the standard toner pattern, while gradation correction fog elimination and/or color balance can be performed at the same time automatically or manually by adjusting $V_O$ and $V_B$.

44 Claims, 26 Drawing Sheets output level

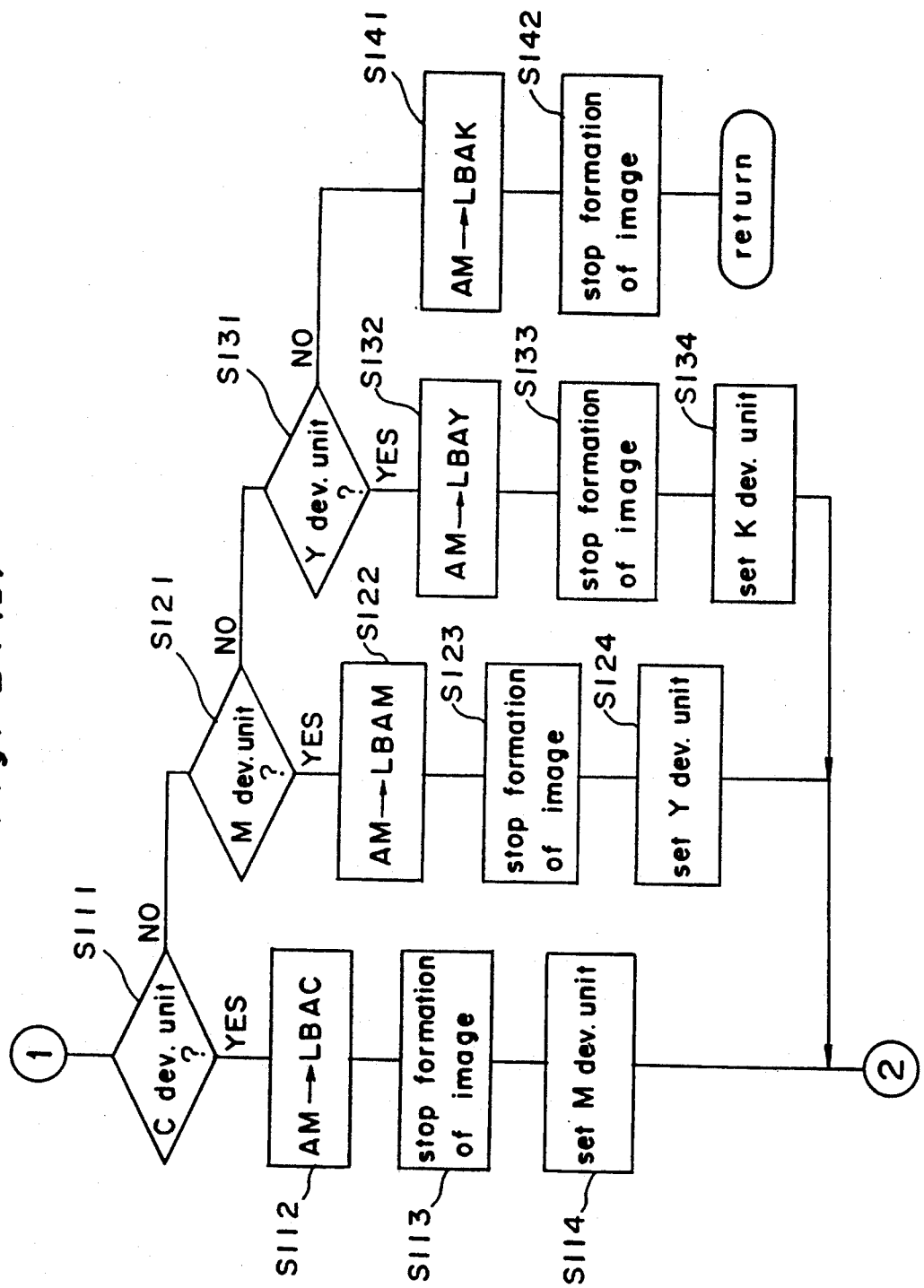

APPARATUS FOR FORMING AN IMAGE WITH USE OF ELECTROPHOTOGRAPHIC PROCESS INCLUDING GRADATION CORRECTION

BACKGROUND OF THE INVENTION

1. Field of the Invention

The present invention relates to an apparatus such as a digital printer or a digital copying machine for forming an image with use of electrophotographic process with a reversal development system.

2. Description of Related Art

In the electrophotographic process with a reversal development system, regulations in the process such as the control of the density or the gradation adjustment of an image to be formed are performed in order to get an optimum reproduction of the image in correspondence with the scattering of the characteristics of the photoconductor layer and the toners, the kind of a document to be reproduced or the environment around the apparatus.

The density of an image to be formed with use of electrophotographic process with a reversal development system can be regulated by controlling the grid electric potential $V_G$ of the charger and the bias electric voltage $V_B$ of the development device. The grid electric potential $V_G$ determines the surface electric potential $V_o$ of the photoconductor sensitized by the charger, and then affects the decay electric potential $V_I$ of an electrostatic latent image formed on the photoconductor generated by the exposure. Further, the bias voltage $V_B$ affects the amount of toners carried onto and adhered to the electrostatic latent image from the surface of the development device according to the development electric voltage $|V_B - V_I|$.

Then, in this type of an apparatus for forming a digital image, a standard toner image of an intermediate density is formed on the photoconductor by using the exposure of a predetermined quantity of light under a predetermined grid electric potential $V_G$ and bias one $V_B$, and a sensor is installed in order to sense the reflecting light from the standard toner image so as to detect the amount of the toners adhered. Then, the automatic density control is performed by controlling the grid and bias electric potentials, $V_G$ and $V_B$, so as to make the maximum density of an image constant automatically according to the value detected by the sensor.

However, there are other points to be considered when the density is controlled automatically by changing the grid and bias electric potentials, $V_G$ and $V_B$.

The elimination of fog is one of important problems in an apparatus for forming a digital image, especially a full-color digital image. The fog depends basically on the grid and bias electric potentials, $V_G$ and $V_B$, so that the two electric potentials have to be controlled suitably in order to prevent a fog. However, the elimination of a fog should not affect the automatic density control.

Further, the effect on the gradation correction (so-called gamma correction) has to be considered in case of a half-tone image. In general, the density of an image of a document to be read is not proportional to a density of an image to be reproduced because of the photosensitive characteristics of the photoconductor, the characteristics of toners, the environment (humidity, temperature or the like) to be used and others. This is called the gamma characteristic. Then the gradation correction is needed to correct the quantity-of-light data of exposure beforehand in correspondence with a density data to be read is needed in order to enhance the fidelity of an image to be reproduced. However, if the grid and bias electric potentials $V_G$ and $V_B$ are changed, the gamma characteristics are also affected. Thus, as far as the gamma correction according to the change in the gamma characteristics is not performed, the fidelity of a half-tone image to be reproduced is deteriorated.

In case of a digital full-color image, the color balance of four colors, cyan, megenta, yellow and black, is one of the important problems. The color balance is determined by the read-out characteristics of the image-reading device and the output density characteristics of the printer part. Previously, the color balance correction is performed in the image-reading device. However, the above-mentioned automatic density control by changing $V_B$ and $V_G$ also affects the color balance largely.

SUMMARY OF THE INVENTION

An essential object of the present invention is to provide an apparatus for forming a digital image wherein the automatic density control, the gradation correction and the elimination of fog are performed in combination.

Another object of the present invention is to provide an apparatus for forming a digital full-color digital image wherein the automatic density control, the gradation control and the color balance are performed in combination.

An apparatus according to the present invention for forming a digital image with use of electrophotographic process comprises: (a) a photoconductor layer; (b) a charger which sensitized said photoconductor layer at a desired initial electric potential; (c) exposure means for exposing the sensitized photoconductor layer to form an electrostatic latent image; (d) a development device which develops the electrostatic latent image to form a toner image; (a) application means for applying a bias electric voltage to said development device; (f) detection means for detecting the state of the surface of said photoconductor layer; (g) determination means for determining the values of the initial electric potential and the bias electric voltage in correspondence with the results detected by said detection means; (h) charger control means for controlling said charger so that the initial electric potential of said photoconductor layer becomes the value determined by said determination means; (i) bias control means for controlling said application means so as to make said bias electric voltage to become the value determined by said determination means; (j) input means for inputting data by an operator; and (k) correction means for controlling said charger and/or said application means so as to change the value of the initial electric potential set by said charger control means and/or the value of the bias electric voltage set by said bias control means in correspondence with the data set by said input means.

A second apparatus according to the present invention for forming a digital image with use of electrophotographic process comprises: (a) a photoconductor layer; (b) a charger which sensitized said photoconductor layer at a desired initial electric potential; (c) exposure means for exposing the sensitized photoconductor layer to form an electrostatic latent image; (d) a development device which develops the electrostatic latent image to form a toner image; (e) exposure control means for controlling said exposure to form a standard image on said photoconductor layer; (f) detection means for detecting the density of said standard toner image formed on said photoconductor layer; (g) input means for inputting an adjustment signal to be used to adjust the density of an image to be formed; and (h) control means for controlling said charger and/or said application means according to the density of said standard toner image detected by said detection means and said adjustment signal inputted by using said input means.

A third apparatus according to the present invention for forming a multi-color image with use of electrophotographic process comprises: (a) photoconductor layer; (b) a charger which sensitizes said photoconductor layer at a desired initial electric potential; (c) exposure means for exposing the sensitized photoconductor layer to form an electrostatic latent image; (d) a plurality of development devices each including toners of a color different to each other, to develop the electrostatic latent image formed on said photoconductor layer; (e) application means for applying bias electric voltages to each development devices; (f) transfer means for transferring a toner image to a paper, which toner image having been formed on said photoconductor layer by said plurality of development devices; (g) means for forming a plurality of standard images each of a different color on said photoconductor layer; (h) detection means for detecting the densities of said plurality of standard images; (i) input means for inputting values by an operator; and (j) control means for controlling the initial electric voltage and/or the bias electric voltage in correspondence with the results detected by said detection means and the values inputted by using said input means so as to charge the color balance of a multi-color image to be formed on the paper.

A fourth apparatus according to the present invention for forming a multi-color image with use of electrophotographic process comprises: (a) photoconductor layer; (b) a charger which sensitizes said photoconductor layer at a desired initial electric potential; (c) exposure means for exposing the sensitized photoconductor layer to form an electrostatic latent image; (d) a plurality of development devices each including toners of a color different to each other, to develop the electrostatic latent image formed on said photoconductor layer; (e) application means for applying bias electric voltages to each development devices; (f) transfer means for transferring a toner image to a paper, which toner image having been formed on said photoconductor layer by said plurality of development devices; (g) input means for inputting values by an operator; (h) control means for controlling the initial electric potential and/or the bias electric voltage in correspondence with the values inputted by using said input means so as to charge the color balance of a multi-color image to be formed on the paper.

A fifth apparatus according to the present invention for forming an image with use of electrophotographic process comprises: (a) photoconductor layer; (b) a charger which sensitizies said photoconductor layer at a desired initial electric potential; (c) exposure means for exposing the sensitized photoconductor layer to form an electrostatic latent image; (d) a development device which develops the electrostatic latent image formed on said photoconductor layer to form a toner image; (e) application means for applying a bias electric voltage to said development device; (f) detection means for detecting the density of the toner image formed on said photoconductor layer; (g) determination means for determining the values of the initial electric potential and the bias electric voltage according to the results detected by said detection means; (h) control means for controlling said charger so as to make the initial electric potential of said photoconductor layer the value determined by said determination means and for controlling said application means so as to make the bias electric voltage the value determined by said determination means; (i) input means for inputting a for elimination signal; wherein when a for elimination signal is inputted by said input means, said control means controls said charger so as to change the initial electric potential according to the fog elimination signal while controlling said application means so as to keep the bias electric voltage the value determined by said determination means.

A sixth apparatus according to the present invention for forming an image with use of electrophotographic process, comprises: (a) a photoconductor layer; (b) a charger which can sensitize said photoconductor layer at a desired initial potential; (c) exposure means for exposing said photoconductor layer sensitized at the initial electric potential to form an electrostatic latent image; (d) a developer device which can develop the electrostatic latent image formed on said photoconductor layer to form a toner image; (e) application means for applying a bias electric voltage to the developer device; (f) first forming means for controlling said charger, said exposure means, said developer device, and said application means so as to form a first standard image on said photoconductor layer; (g) second forming means for controlling said charger, said exposure means, said developer means and said application means so as to form a second standard image on said photoconductor layer, which second standard image having a density different from that of the first standard image; (h) detection means for detecting the density of the toner image formed on said photoconductor layer; (i) determination means for determining the value of the bias electric voltage according to the density of the second standard image detected by said detection means, and for determining the value of the initial electric potential according to the first and second standard images detected by said detection means; and (j) control means for controlling said charger so that the initial electric potential becomes the value determined by said determination means, and for controlling said application means for controlling so that the bias electric voltage becomes the value determined by said determination means.

A seventh apparatus according to the present invention for forming an image with use of electrophotographic process comprises: (a) a photoconductor layer; (b) a charger which can sensitize said photoconductor layer; (c) exposure means for exposing said photoconductor layer having been sensitized at the initial electric potential, to form an electrostatic latent image; (d) exposure control means for controlling the intensity of light of exposure by said exposure means according to an image density signal representing the density of each pixel of an image to be formed; (e) a development device which develops the electrostatic latent image, formed on said photoconductor layer, to form a toner image; (f) application means for applying a bias voltage to the development device; (g) density adjustment means for controlling said charger and/or said application means to change the initial electric potential and/or the bias voltage so as to adjust the density of each pixel; (h) memory means for storing a plurality of gradation correction data; and (i) selection means for selecting one of the gradation correction data stored in said memory means according to the value of $(V_B - V_I)/(V_O - V_I)$, wherein $V_B$ represents the bias electric voltage, $V_O$ the initial electric potential, and $V_I$ the surface electric potential of the photoconductor layer when the photoconductor layer is exposed at the light intensity in correspondence with the largest image density signal, wherein said exposure control means controls said exposure means so as to expose said photoconductor layer at the light intensity according to the gradation correction data selected by said selection means.

A eighth apparatus according to the present invention for forming an image with use of electrophotographic process, comprises: (a) photoconductor layer; (b) a charger which sensitizes said photoconductor layer at a desired initial electric potential; (c) exposure means for exposing the sensitized photoconductor layer to form an electrostatic latent image; (d) a development device which develops the electrostatic latent image formed on said photoconductor layer to form a toner image; (e) application means for applying a bias electric voltage to said development device; (f) exposure control means for controlling said control means to expose said photoconductor layer at a predetermined light intensity so as to form a standard image on the photoconductor layer; (g) detection means for detecting the density of the standard image formed on said photoconductor layer; (h) density control means for controlling the density of an image to be formed according to the density of the standard image detected by said detection means; (i) set means for setting the value of the initial electric potential when the standard image is formed; and (j) charger control means for controlling the charger so as to sensitize the photoconductor layer at the value set by said set means when the standard image is formed; wherein said exposure control means controls said control means so as to charge the light intensity to form the standard image according to the value set by said set means.

A ninth apparatus according to the present invention for forming an image with use of electrophotographic process comprises: (a) a photoconductor layer; (b) a charger which can sensitize said photoconductor layer; (c) exposure means for exposing said photoconductor layer having been sensitized at the initial electric potential, to form an electrostatic latent image; (d) exposure control means for controlling the intensity of light of exposure by said exposure means according to an image density signal representing the density of each pixel of an image to be formed; (e) a development device which develops the electrostatic latent image, formed on said photoconductor layer, to form a toner image; (f) application means for applying a bias voltage to the development device; (g) detection means for detecting the density of the toner image formed on said photoconductor layer; (h) determination means for determining the values of the initial electric potential and the bias electric voltage according to the results of the detection by said detection means; (i) input means for inputting a fog elimination signal; (j) adjustment means for adjusting the initial electric voltage, determined by said determination means, according to the fog elimination signal inputted by said input means; (k) control means for controlling said application means so that the bias electric voltage becomes the value determined by said determination means, and for controlling said charger so that the initial electric potential of said photoconductor layer becomes the value adjusted by said adjustment means; (l) first memory means for storing a plurality of gradation adjustment data in correspondence with various combinations of the initial electric potential and the bias electric voltage; (m) first selection means for selecting a gradation adjustment data stored in said first memory means in correspondence with the bias electric voltage determined by said determination means and the initial electric potential; (n) second memory means for storing a plurality of addition data in correspondence with the fog elimination means; (o) second selection means for selecting an addition data stored in said second memory means in correspondence with the fog elimination signal inputted by said input means; and (p) addition means for adding the addition data selected by said second selection means and the gradation correction data selected by said first selection means; wherein said exposure control means controls the exposure means to change the light intensity of exposure according to the output value supplied from said addition means.

A tenth apparatus according to the present invention for forming an image with use of electrophotographic process comprises: (a) a photoconductor layer; (b) a charger which can sensitize said photoconductor layer at a desired initial potential; (c) exposure means for exposing said photoconductor layer sensitized at the initial electric potential to form an electrostatic latent image; (d) exposure control means for controlling the light intensity of exposure to said photoconductor layer according to an image density signal representing the density of each pixel of an image to be formed; (e) a developer device which can develop the electrostatic latent image formed on said photoconductor layer to form a toner image; (f) application means for applying a bias electric voltage to the developer device; (g) first forming means for controlling said charger, said exposure means, said developer device, and said application means so as to form a first standard image on said photoconductor layer; (h) second forming means for controlling said charger, said exposure means, said developer means and said application means so as to form a second standard image on said photoconductor layer, which second standard image having a density different from that of the first standard image; (i) first memory means for storing a plurality of gradation adjustment data; (j) first selection means for selecting a gradation adjustment data stored in said first memory means according to the density of the second standard image detected by said detection means; (k) second memory means for storing a plurality of addition data; (l) second selection means for selecting an addition data stored in said memory means according to the density of the first standard image detected by said detection means; and (m) addition means for adding the addition data selected by said second selection means to the gradation adjustment data selected by said first selection means; wherein said exposure control means controls the light intensity of exposure according to the output value of said addition means.

An eleventh apparatus according to the present invention for forming an image with use of electrophotographic process comprises: (a) a photoconductor layer; (b) a charger which sensitizes said photoconductor layer at a desired initial electric potential; (c) conversion means for converting a digital signal to an analog signal, which digital signal representing the density of each pixel of an image to be form; (d) amplification means for amplifying the output signal of said conversion means at a gain; (e) exposure means for for exposing said photoconductor layer, having been sensitized at the initial electric potential, at the light intensity of exposure according to a signal supplied from said amplification means, to form an electrostatic latent image; (f) a development device which develops said electrostatic latent image formed on said photoconductor layer to form a toner image; (g) detection means for detecting the surface temperature of said photoconductor layer; and (h) change means for changing the gain of said amplification according to the surface temperature detected by said detection means.

A twelfth apparatus according to the present invention for forming an image with use of electrophotographic process comprises: (a) a photoconductor layer; (b) a charger which can sensitize said photoconductor layer at a desired initial potential; (c) exposure means for exposing said photoconductor layer sensitized at the initial electric potential to form an electrostatic latent image; (d) a developer device which can develop the electrostatic latent image formed on said photoconductor layer to form a toner image; (e) exposure control means for controlling said exposure means to expose said photoconductor layer at a predetermined light intensity so as to form a standard image on said photoconductor layer; (f) detection means for detecting the density of the standard image formed on the photoconductor layer; (g) density control means for controlling the density of an image to be formed with use of electrophotographic process according to the density of the standard image detected by said detection means; (h) condition detection means for detection an environment condition of said photoconductor layer; wherein said exposure control means makes said exposure means change the light intensity to form the standard image according to the result of the detection by said condition detection means.

An advantage of the present invention is to provide an apparatus for forming a digital image which can eliminate a fog while controlling the density and correcting the gradation characteristics automatically if necessary.

Another advantage of the present invention is to provide an apparatus for forming a digital full-color image, which can control the color balance of an image easily while controlling the density and the gradation of the image.

BRIEF DESCRIPTION OF THE DRAWINGS

These and other objects and features of the present invention will become clear from the following description taken in conjunction with the preferred embodiment thereof with reference to the accompanying drawings, in which:

FIGS. 24(a) and 24(b) are flowcharts of AIDC measurement processing;

DETAILED DESCRIPTION OF THE PREFERRED EMBODIMENTS (a) the structure of digital color copying machine Referring now to the drawings, wherein like reference characters designate like or corresponding parts throughout the drawings, FIG. 1 shows the entire structure of a digital color copying machine according to an embodiment of the present invention. The copying machine consists mainly of an image reader part 100 for reading the image of a document and a print part 200 for reproducing the image read by the image reader part 100 with use of electrophotographic process.

Figure 1:
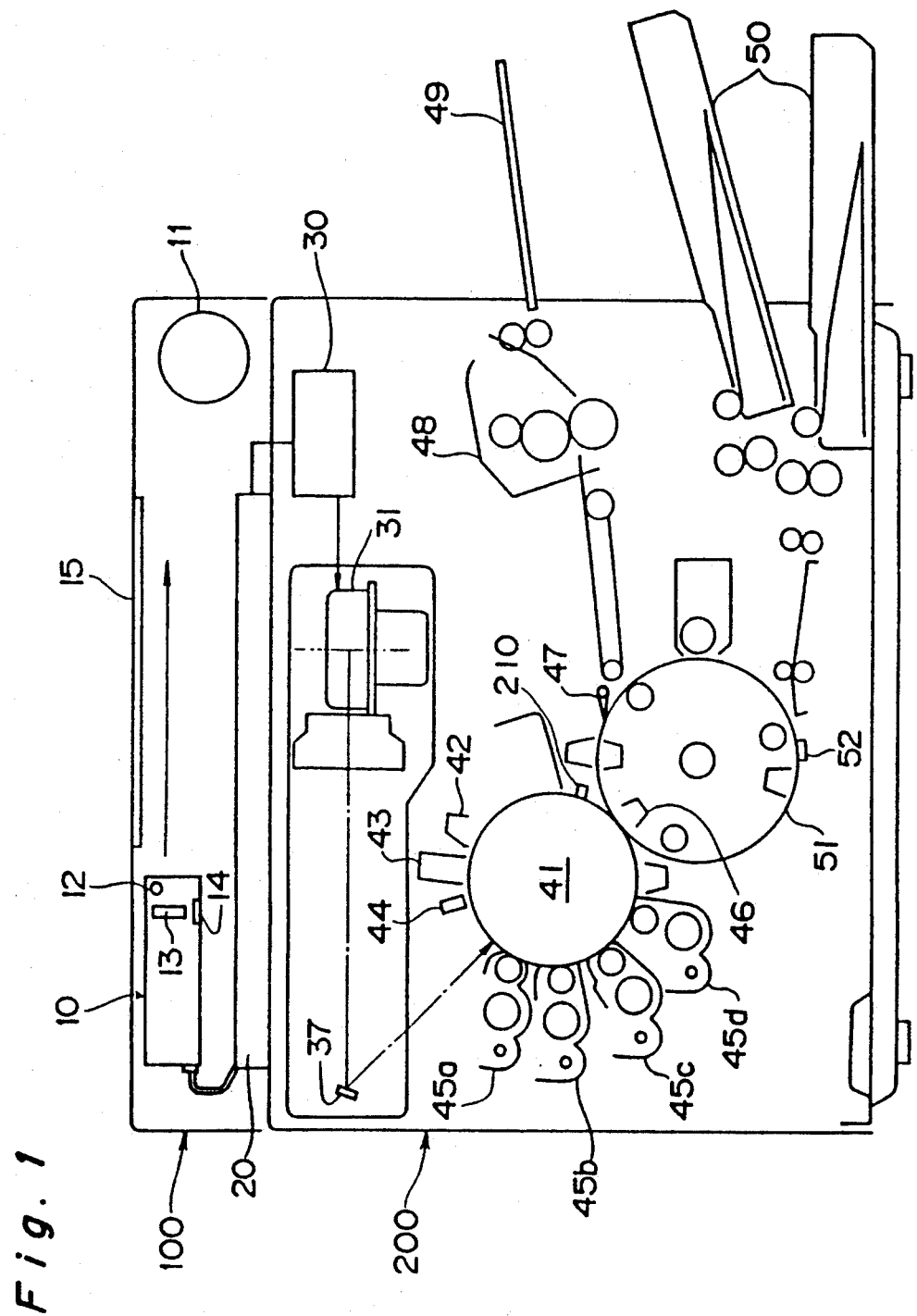
FIG. 1 is a sectional view of a digital color copying machine of an embodiment according to the present invention.

In the image reader part 100, a scanner 10 has an exposure lamp 12 for illumination a document, a rod lens array 13 for concentration the reflecting light from the document, and a charge-coupled device (CCD) color image sensor 14 of a contact type for transducing the concentrated light to an electric signal. The scanner 10 is driven by a motor 11, when a document is read, to move in a direction (subscan direction) shown by an arrow so as to scan the document placed on a platen 15. The image of the document illuminated by the exposure lamp 12 is transduced into an electric signal by the image sensor 14. Multi-level electric signals of three colors of red (R), green (G) and blue (B) obtained by the image sensor 14 are converted into 8-bit gradation data of four colors of yellow (Y), magenta (M), cyan (C) and black (B) and the gradation data are stored in a buffer memory 30 for synchronization.

Figure 4:
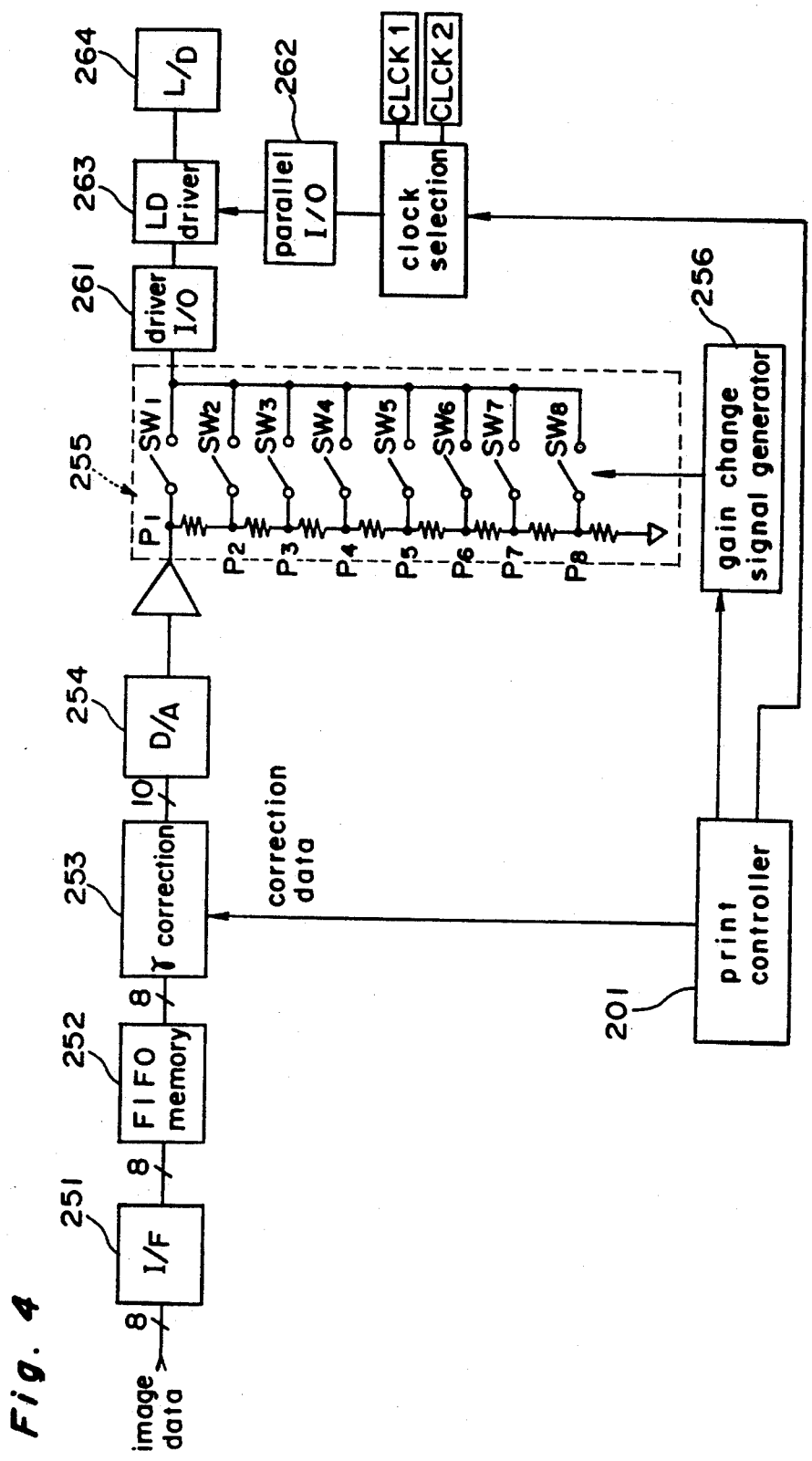
FIG. 4 is a block diagram of an image processing system of a print controller.

Next, in the copying part 200, a print head unit 31 performs the gradation correction (that is, gamma correction) of the received gradation data according to the gradation characteristics in the electrophotographic process for forming an image, converts the corrected gradation data into analog data, and generates a driving signal of a laser diode so as to make the laser diode emit a beam (refer FIG. 4).

The laser beam emitted from the print head unit 31 according to the gradation data exposes a photoconductor drum 41 via a reflecting mirror 37. In each copy action, the photoconductor drum 41 having a photoconductor layer, driven to be rotated, is illuminated by an eraser lamp 42, and the photoconductor layer is sensitized by a sensitizing charger 43 uniformly. When the exposure of the photoconductor drum 41 is performed in this state, an electrostatic latent image of a document is formed on the photoconductor drum 41. Then, one of toner development units 45a–45d of cyan, magenta, yellow and black is selected and develops the electrostatic latent image on the photoconductor drum 41 to form a toner image, which is transferred by a transfer charger 46 to a paper wound on a transfer drum 51. On the other hand, a standard toner image is formed in a predetermined area on the photoconductor drum 41 which is exposed at a predetermined light intensity and is developed. The amount of the adhered toners of the standard toner image is detected optically by an AIDC sensor 210. That is, the toner image is illuminated obliquely, and the reflecting light from the toner image is detected. The amount of the adhered toners can be obtained from the quantity of the reflecting light.

The above-mentioned print process is iterated as to the four colors of yellow (Y), magenta (M), cyan (C) and black (B). The scanner repeats in each process the scan action in synchronization with the action of the photoconductor drum 41 and the transfer drum 51. Then the paper is separated from the transfer drum 51 by operating a separation claw 47, is fixed by a fixing unit 48, and is discharged in a tray 49. A paper is fed by a paper cassette 50, is chucked at its front tip on the transfer drum 51 by a chucking mechanism 52 so as not to cause a discrepancy of the position of a paper when the transfer is performed.

Figure 2:
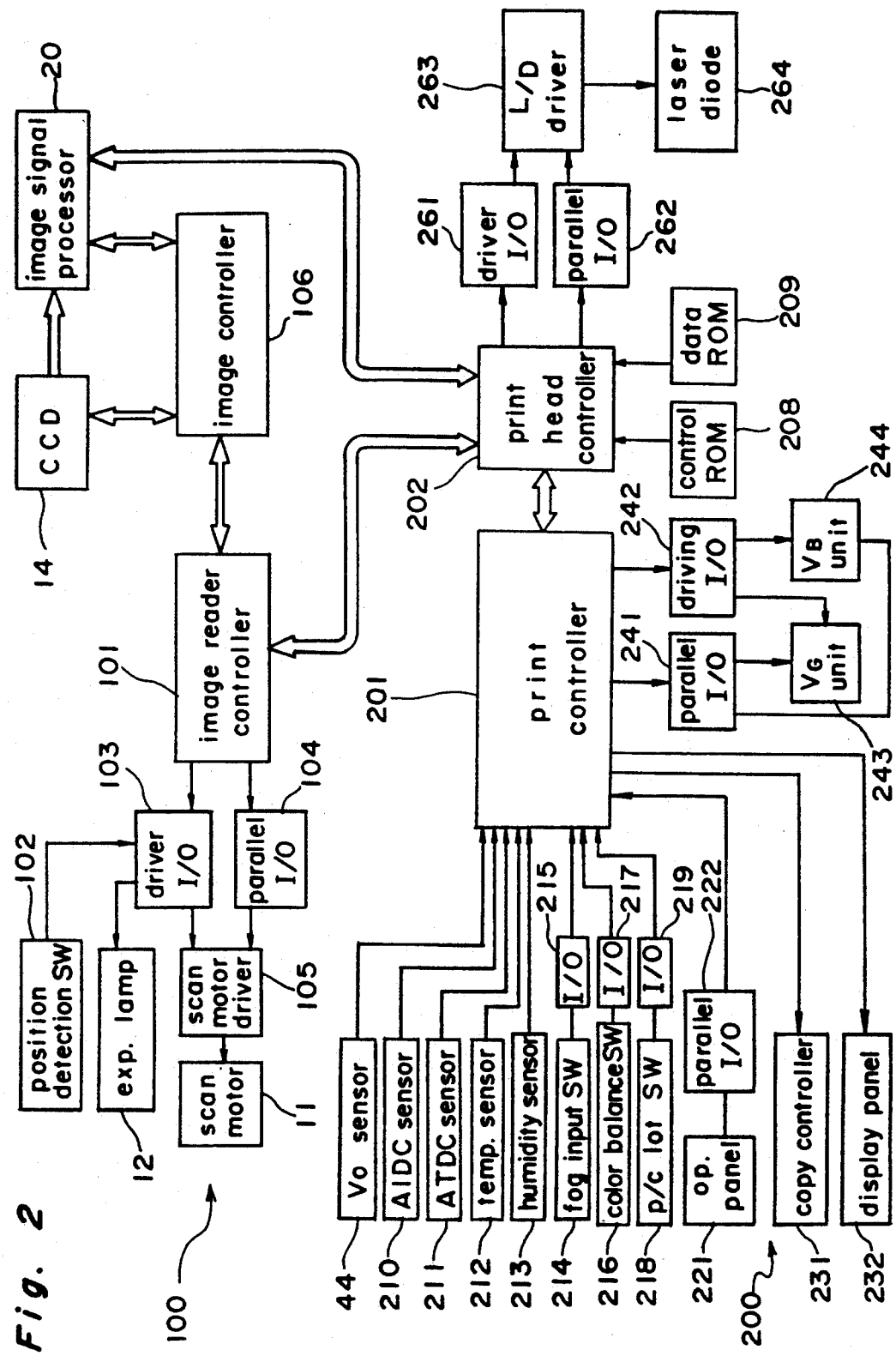
FIG. 2 is a block diagram of a control system of the digital color copying machine.

FIG. 2 shows a whole block diagram of a control system of the digital color copying machine of the embodiment of the present invention.

The image reader part 100 is controlled by an image reader controller 101, which controls the exposure lamp 12 via a driver input/output (I/O) device 103 according to the position signal from a position detection switch 102 which shows the position of a document on the platen 15. The image reader controller 101 also controls a scan motor driver 105 via the driver I/O device 103 and a parallel I/O device 104. The scan motor 11 is driven by the scan motor driver 105.

On the other hand, the image reader controller 101 is connected to an image controller 106 via a bus. The image controller 106 is connected via buses to the CCD color image sensor 14 and an image signal processor 20. An image signal from the image sensor 14 is supplied to the image signal processor 20 for the processing to be explained later.

The print part 200 has a print controller 201 for controlling print action. The print controller 201 having a CPU is connected to a control read-only-memory (ROM) 202 storing a program for control and to a data ROM 203 for storing various kinds of data such as gamma correction data. The print controller 201 controls the print action according to the data stored in the data ROM 203.

The print controller 201 receives analog signals from various sensors: a $V_O$ sensor 44 for detecting the surface electrical potential of the photoconductor drum 41, the AIDC sensor 210 for detecting optically the amount of the adhered toners of a standard toner image formed on the photoconductor drum 41, an ATDC sensor 211 for detecting the toner density in the development units 45a–45d, a temperature sensor 212 and a humidity sensor 213. Further, the print controller 201 is connected to a fog input switch (2 bits) 214 for setting the level of fog elimination, color balance switches (each 4 bits) 216 for setting the color balance level of each color and a photoconductor lot switch (3 bits) 218 for representing the lot dependence of the photoconductor characteristics via I/O devices 215, 217 and 219, respectively. The fog input value (4 steps) is set with a DIP switch by a service man or by a user in this embodiment, but it may by set from an operational panel 221 via a parallel I/O device 222. Various data can be inputted to print controller 201 via the parallel I/O device 222 by a key-input with the operational panel 221.

The print controller 201 controls a copy controller 231 and a display panel 232 according to the data obtained from the sensors 44, 210–213, the operational panel 221, input switches 214, 216, 218 and the data ROM 203, while controls a high voltage ($V_G$) unit 243 for generating the grid electric potential $V_G$ of the sensitization charger 43 and a high voltage ($V_B$) unit 244 for generating the development bias voltage $V_B$ of the development units 45a–45d via a parallel I/O device 241 and a driver I/O unit 242 in order to control the density automatically with the AIDC sensor 210 or manually with a key-input in the operational panel 221.

Further, the print controller 201 is connected via an image data bus to the image signal processor 20 of the image reader part 100, while it controls a laser diode (I/O) driver 263 via a driver I/O device 261 and a parallel I/O device 262 by referring the contents of the data ROM 203 storing the data for gamma correction. A laser diode 264 is driven by the driver 263 for emitting a laser beam. The expression of gradation can be performed by the modulation of the intensity of a laser beam emitted by the laser under a constant pulse width. (In some embodiments, the gradation is expressed by using pulse width modulation method under a constant intensity of light (refer section (d-6).)

(b) Processing of image signal

Figure 3:
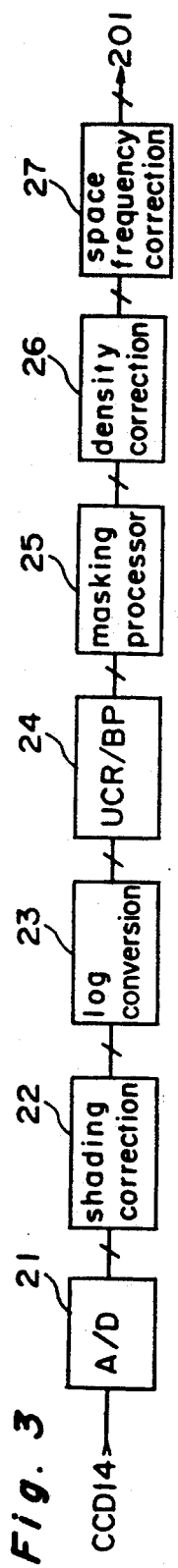
FIG. 3 is a block diagram of a digital signal processor.

FIG. 3 shows a flow of the processing of image signal from the CCD color image sensor 14 via the image signal processor 20 to the print controller 201. By referring FIG. 3, the processing of an output signal from the CCD color image sensor 14 is explained.

In the image signal processor 20, an image signal obtained by the CCD color image sensor 14 by using the photoelectric properties is converted to a multi-level digital image data of R, G, B by an analog-to-digital converter 21. The image data converted is corrected for shading by a shading correction circuit 22. The image data corrected is converted to a density data of an actual image by using a log conversion with a log conversion circuit 23. Further, the density data is processed by a UCR/BP (undercolor remove/black paint) circuit 24 to remove unnecessary black coloring and to generate a true black data K from the R, G, B data, and then the data R, G, B of the three colors, red, green and black, are transformed into data Y, M, C of the three colors of yellow, magenta and cyan by the masking processor circuit 25. A density correction circuit 26 processes density correction by multiplying predetermined coefficients to the Y, M, C data transformed as describe above, and then a space frequency correction circuit 27 performs the space frequency correction on the data processed by the density correction circuit 26. Finally, the data of each color are supplied to the print controller 201 as a multi-level density data of level 0–255.

FIG. 4 shows a block diagram of image data processing in the print controller 201, wherein an image data (8-bit data for each color) is supplied from the image signal processor 20 via an interface 251 to the first-in-first-out memory (herein after referred to as FIFO memory) 252, which is a line buffer memory having a capacity of a predetermined number of lines in the main scan direction. The FIFO memory 252 is used to absorb the difference between clock frequencies of the image reader part 100 and the printing part 200. A data of the FIFO memory 252 is supplied to a gamma correction part 253, while gamma correction data is sent to the gamma correction part 253 by the print controller 201 as will be explained later. Then, the gamma correction part 253 corrects the input data (ID) to supply an output level to a digital-to-analo converter 254, which converts the output level (a digital value) to an analog electric voltage. This analog electric voltage is amplified by a gain change circuit 255 according to a gain set value received from the print controller 201 for changing switches $SW_1$–$SW_8$ in correspondence with different powers $P_1$–$P_8$, and then the amplified voltage is sent via a driver I/D device 261 to a laser diode driver 263 so as to make the laser dilde 264 emit a laser beam of an intensity (or of a pulse width in modified embodiments) according to the amplified voltage. The print controller 201 sends a clock signal via a parallel I/O device 262 to the laser diode driver 263.

(c) integration of automatic density control and fog elimination

In an electrophotographic process of the inversion deposition type, the density is controlled by the grid electric potential $V_G$ and the bias electric potential $V_B$.

Figure 5:
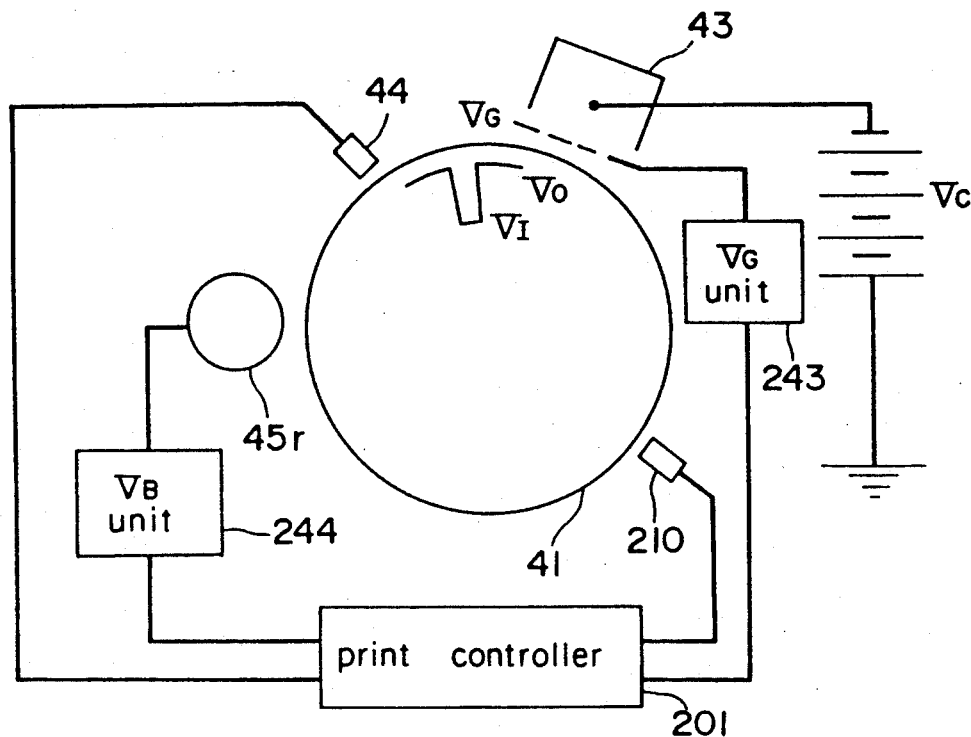
FIG. 5 is a schematic diagram showing the arrangement around the photoconductor drum.

FIG. 5 shows schematically the arrangement of the sensitizing charger 41 and the development unit (for example, a unit 45r) around the photoconductor drum 41. The sensitizing charger 43 of a discharge electric potential $V_O$ is arranged opposite to the photoconductor drum 41, and a negative grid electric potential $V_G$ is applied to the grid of the sensitizing charger 43 by the high voltage ($V_G$) unit 243. The electric potential $V_O$ at the surface of the photoconductor drum 41 is measured by the $V_O$ sensor 44, and the surface electric potential $V_O$ is regulated by adjusting the grid electric potential $V_G$ according to the measured value of the $V_O$ sensor 44.

First, before the exposure with a laser beam, a negative surface electric potential $V_O$ is applied to the photoconductor drum 41 by the sensitizing charger 43, while a negative small bias electric potential $V_B$ ($|V_B| > |V_O|$) is applied to the roller of the development unit 45r by the high voltage ($V_B$) unit 244. That is, the electric potential of the surface of the development sleeve of the development unit 45r is $V_B$.

If by exposing with a laser beam, the electric potential of the photoconductor drum 41 at a position illuminated is decreased from the surface electric potential $V_O$ to a decay electric potential $V_I$ of the electrostatic latent image. If the decay electric potential $V_I$ becomes lower than the development bias electric potential $V_B$, toners having negative charges and being carried to the surface of the sleeve of the development unit 45r are adhered onto the photoconductor drum 41. It is undesirable that the difference between the surface electric potential $V_O$ and the bias electric potential $V_B$ is too large or too small. The amount of the toner to be adhered increases with increasing deposition electric voltage $\Delta V = |V_B - V_I|$. On the other hand, the decay electric potential $V_I$ varies with the surface electric potential $V_O$ even at the same light intensity of exposure. Then, if the surface electric potential $V_O$ and the deposition bias electric potential $V_B$ is changed under a condition that the difference between $V_O$ and $V_B$ is kept in a certain degree of range, for example that the difference is kept almost constant, the amount of toners to be adhered can be varied because of a change in the difference between $V_B$ and $V_1$, while controlling the density.

On the other hand, the amount of toners to be adhered when the photoconductor drum 41 is exposed at a predetermined light intensity of exposure can be detected by the AIDC sensor 210. That is, a standard toner image is formed on the photoconductor drum 41 by the exposure at the predetermined light intensity as a standard for density control, and the normal reflection light and the scattering reflection light of the standard toner image are detected by the AIDC sensor 210, supplying both detection signals to the print controller 201, which can obtain the amount of toners to be adhered from the difference between the two detection signals. Then, if $V_O$ and $V_G$ are changed according to the detection values, the automatic density control can be performed while keeping the amount of toners to be adhered at the largest density level constant. Though the decay characteristics of the charges of toners change according to changes in environment such as the sensitivity of the photoconductor or the relative humidity, the maximum density can be kept constant automatically by changing $V_O$ and $V_B$. Thus, in this embodiment, one bias electric potential $V_B$ is made to correspond with one grid electric potential $V_G$, and a pair of the set values of ($V_B$, $V_G$) is changed according to a density detection level (LBA) of 0–28 in correspondence with the detection value of the AIDC sensor 210.

TABLE 1

| level | $V_B$ (V) | $V_G$(V) 0 | 1 | 2 | 3 | $\Delta V_G$ (V) | γ correction table 0 | 1 | 2 | 3 |
|---|---|---|---|---|---|---|---|---|---|---|
| 0 | 100 | 200 | 220 | 240 | 260 | 20 | $\gamma_{00}$ | $\gamma_{01}$ | $\gamma_{02}$ | $\gamma_{03}$ |
| 1 | 120 | 220 | 240 | 260 | 280 | ↓ | $\gamma_{10}$ | $\gamma_{11}$ | $\gamma_{12}$ | $\gamma_{13}$ |
| 2 | 140 | 240 | 260 | 280 | 300 |   | $\gamma_{20}$ | $\gamma_{21}$ | $\gamma_{22}$ | $\gamma_{23}$ |
|   |   |   |   |   |   | 30 |   |   |   |   |
| . | . | . | . | . | . | ↓ | . | . | . | . |
| . | . | . | . | . | . | 40 | . | . | . | . |
|   |   |   |   |   |   | ↓ |   |   |   |   |
| 27 | 640 | 740 | 780 | 820 | 860 |   | $\gamma_{27,0}$ | $\gamma_{27,1}$ | $\gamma_{27,2}$ | $\gamma_{27,3}$ |
| 28 | 660 | 760 | 800 | 840 | 880 |   | $\gamma_{28,0}$ | $\gamma_{28,1}$ | $\gamma_{28,2}$ | $\gamma_{28,3}$ |

Table 1 shows an example of the data of a pair of ($V_B$, $V_G$) set as explained above. (The values of $V_B$ and $V_G$ are expressed as absolute values in Table 1 for simplicity though they are negative.) The detection value of the AIDC sensor 210 is made to correspond to a level 0–28 shown at the left-most column on the basis of the magnitude of the detection value, and the value of $V_B$ changes from 100 V by 20 V according to each level, to attain to 660 V at maximum, $V_G$ is kept larger than $V_B$ by 100 V; Thus, $V_G$ changes from 200 V to 760 V. (The difference of $V_G$, $V_B$ between levels can be determined according to the precision of control.) (The four types 0–3 of $V_G$ shown in Table 1 will be explained later.)

Figure 6:
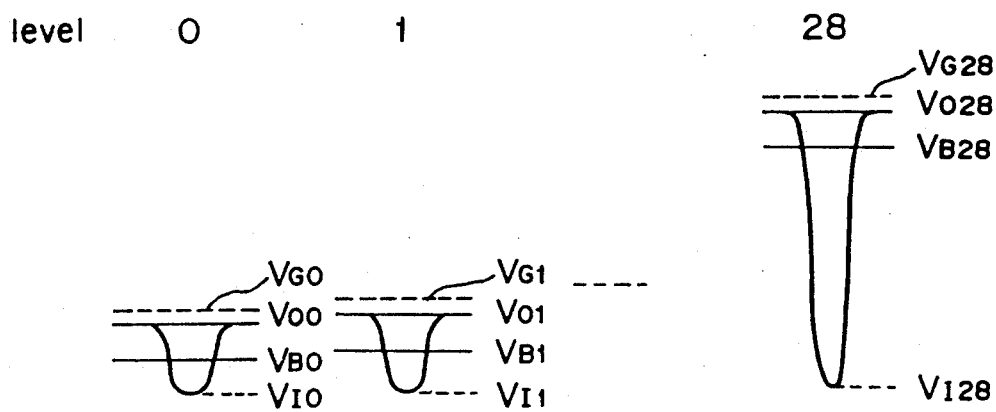
FIG. 6 is a diagram showing the change in the electric potential of the photoconductor in correspondence with the detection level of the AIDC sensor schematically.

FIG. 6 shows a schematic diagram on the change in the electric potential in a section of the photoconductor at each level 0–28, wherein a suffix corresponding to each level is added to $V_G$ $V_O$ and $V_B$. Further, the curve represents the distribution of the electric potential when a dot on the photoconductor is illuminated at the maximum light intensity in correspondence with the density level 255 at each $V_G$, while $V_I$ designates the decay electric potential.

Figure 7:
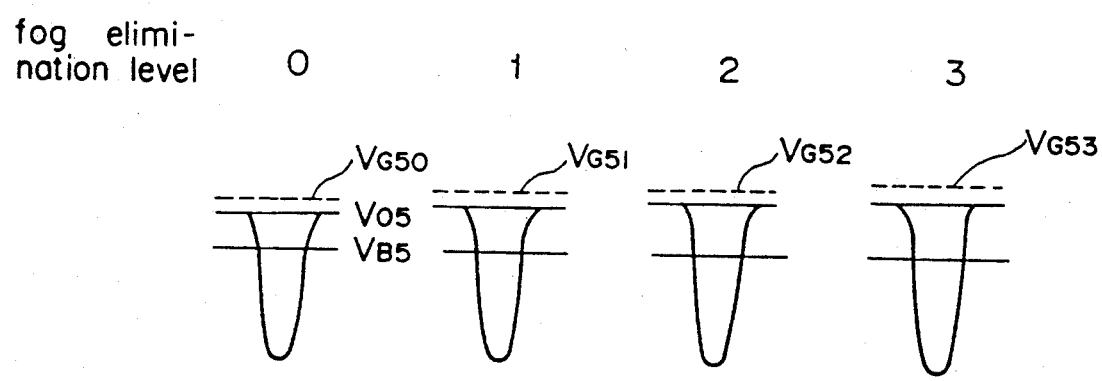
FIG. 7 is a diagram showing the change in electric potential of the photoconductor when $V_G$ is changed while $V_B$ is kept constant.

In an apparatus for forming a digital image, especially a full-color image, with use of electrophotographic process, the elimination of fog is an important problem. In this embodiment, four steps of a fog elimination level (LBK) 0–3 which is decided to be appropriate by an operator can be set by the operator with the fog input switch (2-bit) 214, and the grid electric potential $V_G$ is changed further according to the fog elimination level when a pair of ($V_B$,$V_G$) is changed according to the detection values of the AIDC sensor 210. In other words, as shown in FIG. 7, in a case of input level (OD)=5 with the same bias electric potential, the bias electric potential $V_{B5}$ is determined according to the detection level (LBA) of the AIDC sensor 210, while the grid electric potential is changed in four steps $V_{G50}$-$V_{G53}$ in correspondence with the fog elimination level (LBK) 0–3 set by the operator. As shown in Table 1, the change $\Delta V_G$ of $V_G$ between each levels of the grid electric potential $V_G$ M (M=0-3) in case of the same $V_B$ is as small as 20V at low $V_B$, while increasing 30V or 40V successively at higher $V_B$. Because $\Delta V_G$ is step to be small enough when compared with $V_G$, the effect of the change in $V_G$ is small on the automatic density control and the gradation correction.

Color balance is also an important problem because the apparatus according to the present embodiment is a full-color copying machine. Then, a four-bit color balance bias level (+7−7) (LBC) is set with the color balance switch 216 for each color of cyan, magenta, yellow and black on forwarding or by a service man or a user. The maximum value of the image density at the image signal level 255 is increased or decreased to control color balance on the basis of the color balance bias level of each color. Then, the color balance bias level (LBC) can also be set with the color balance switch 216 when the color balance is not sufficient though the toner density in the development units detected by the AITC sensor 211 is not sufficient or when a user want to perform color balance in order to realize the color balance according to his taste. Therefore, the correlation of the color balance with the above-explained automatic density control and the fog elimination should be taken into account.

In this embodiment, the gradation correction is performed for each color as will be explained later, when the grid and bias electric potentials are changed according to the detection value of the AIDC sensor 210 for the automatic density control and the fog elimination. If the gradation correction is performed ideally, the color balance will be realized automatically in principle without taking the color balance into account. However, color balance is affected largely by the gradation of each color, so that the precision of the gradation correction accompanied by the above-explained change in the grid and bias electric potentials may be insufficient for color balance. Therefore, in this embodiment, the color balance switch 216 is installed in order to allow a user to set color balance (Refer FIG. 26).

The color balance can also be performed by controlling the grid and bias electric potentials. Thus, it is easier for dealing with color balance to relate the color balance with the selection of the grid and bias electric potentials for the automatic density control and the fog elimination. Then, in this embodiment, step of the color balance bias level (LBC) is made the same as a step of the density detection level (LBA) of the AIDC sensor 210. Therefore, the color balance is corrected by changing the grid electric potential $V_G$ and the bias electric potential $V_B$ according to a corrected detection level obtained by adding LBA and LBC. The effect of this processing on the automatic density control and the gradation correction is small, so that color balance correction is performed without sacrificing the automatic density control and the gradation correction.

The characteristics of the AIDC sensor 210 are affected by the positioning, the change in the sensitivity or soil of the sensor. The photoconductor characteristics also vary with the change in environment. Then, high precision of color balance can be obtained by combining the color balance correction with corrections for such effects as mentioned above.

If this embodiment is applied to an apparatus not for a full-color image, the detection level (LBA) can be corrected finely by making the color balance bias level (LBC) correspond with a change in the characteristics of various kinds of parts or a bias level representing a change in environment.

To sum up, the values of (V$_G$, V$_B$) are finally determined by the following data:

| | | |
|---|---|---|
| (a) detection level (LBA) obtained from the AIDC sensor | 0-28 |
| (b) color balance bias level (LBC) obtained from the color balance switch | +7--7 |
| (c) fog input level (LBK) obtained from fog input switch | 0-3 |

On the basis of these data, the value of bias electric potential V$_B$ is selected according to the corrected detection level LBXN (=LBA+LBC), while the value of grid electric potential V$_G$ is selected according to the corrected detection level LBXN and the fog input level LBK (by taking fog elimination into account). (Refer steps S206-S208 in FIG. 29)

(d) integration with gradation correction (d-1) gradation correction

As to the printing of a half-tone image, the gradation characteristics should be taken into account. In general, the read-out density level (hereinafter referred also to input level) (OD) is proportional correctly to the intensity level of light-emitting of laser beam (thus, to the density level (ID) of an image to be reproduced) owing to many complex factors such as the photosensitive characteristics of the photoconductor, the toner characteristics, the environment to be used and the like. In other words, as shown at the upper part in the right-hand side in FIG. 8, the actual characteristic curve B deviates from the linear characteristic curve A to be realized naturally. (It should be noted that both characteristic curves do not intersect the origin owing to fog or the like.) Such a characteristic is called as gamma characteristic (gradation characteristic) in general, and it is especially a large factor on the deterioration of the fidelity of an image to be reproduced of a half-tone document.

Figure 8:
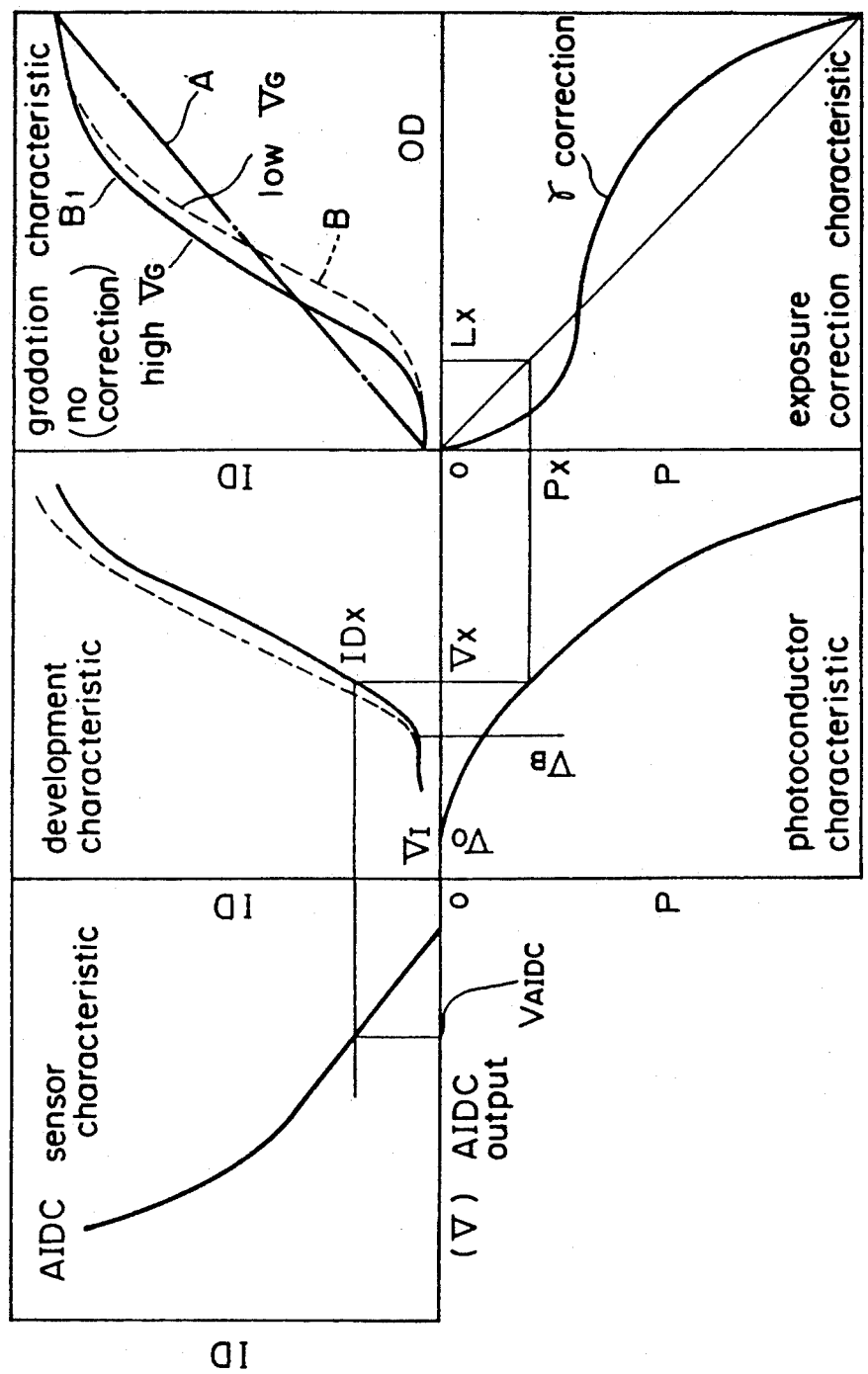
FIG. 8 is a graph showing various characteristics including gradation characteristic.

Then, the linear characteristic curve A is realized by controlling the output characteristic at the gamma correction part 253 on the output power (or laser energy) of the laser diode 264, as shown at the lower part in the right-hand side in FIG. 8. This is called as gradation correction (so-called gamma correction). That is, the output power is increased at low gradations, while it is decreased at high ones, so as to make the density of an image to be reproduced proportional to the degree of gradation.

As shown by the photoconductor characteristics at the lower part in the middle in FIG. 8, the decay electric potential V$_I$ changes nonlinearly with the output power of laser diode. As shown in the development characteristics at the upper part in the middle in FIG. 8, the amount of toners to be adhered also changes nonlinearly, while toners adhere when V$_I$<V$_B$.

Figure 9:
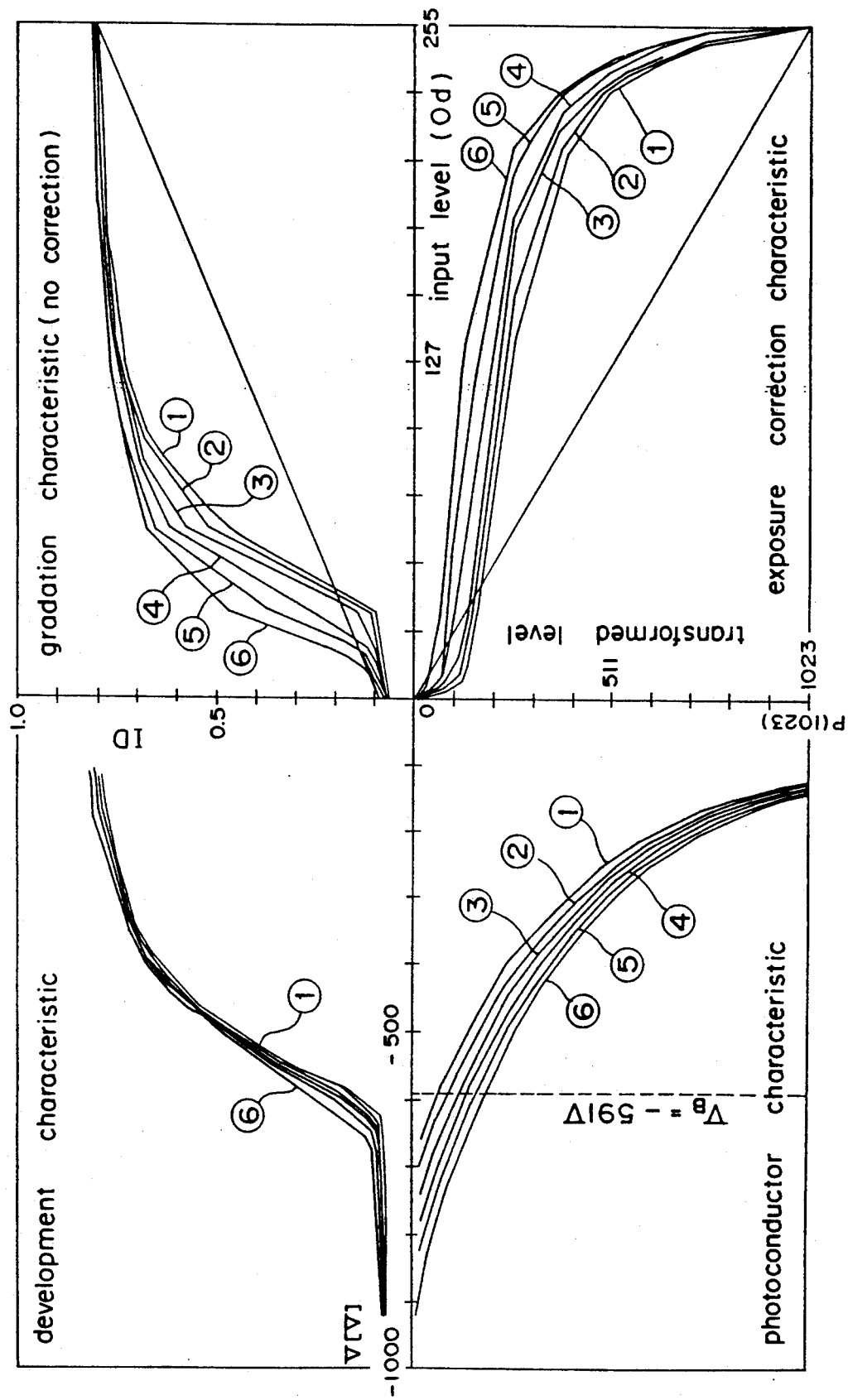
FIG. 9 is a graph of various characteristics when $V_G$ is changed with a constant $V_B$.

FIG. 9 shows graphs of various characteristics under the conditions compiled in Table 2, that is, by changing the grid electric potential V$_G$ at six steps from −700 V to −919 V while keeping the bias electric potential V$_B$−591 V. (The numerals 1-6 and 1-8 in FIGS. 9 and 10 represent the numbers in Tables 2 and 3 at the leftmost colum.)

Figure 10:
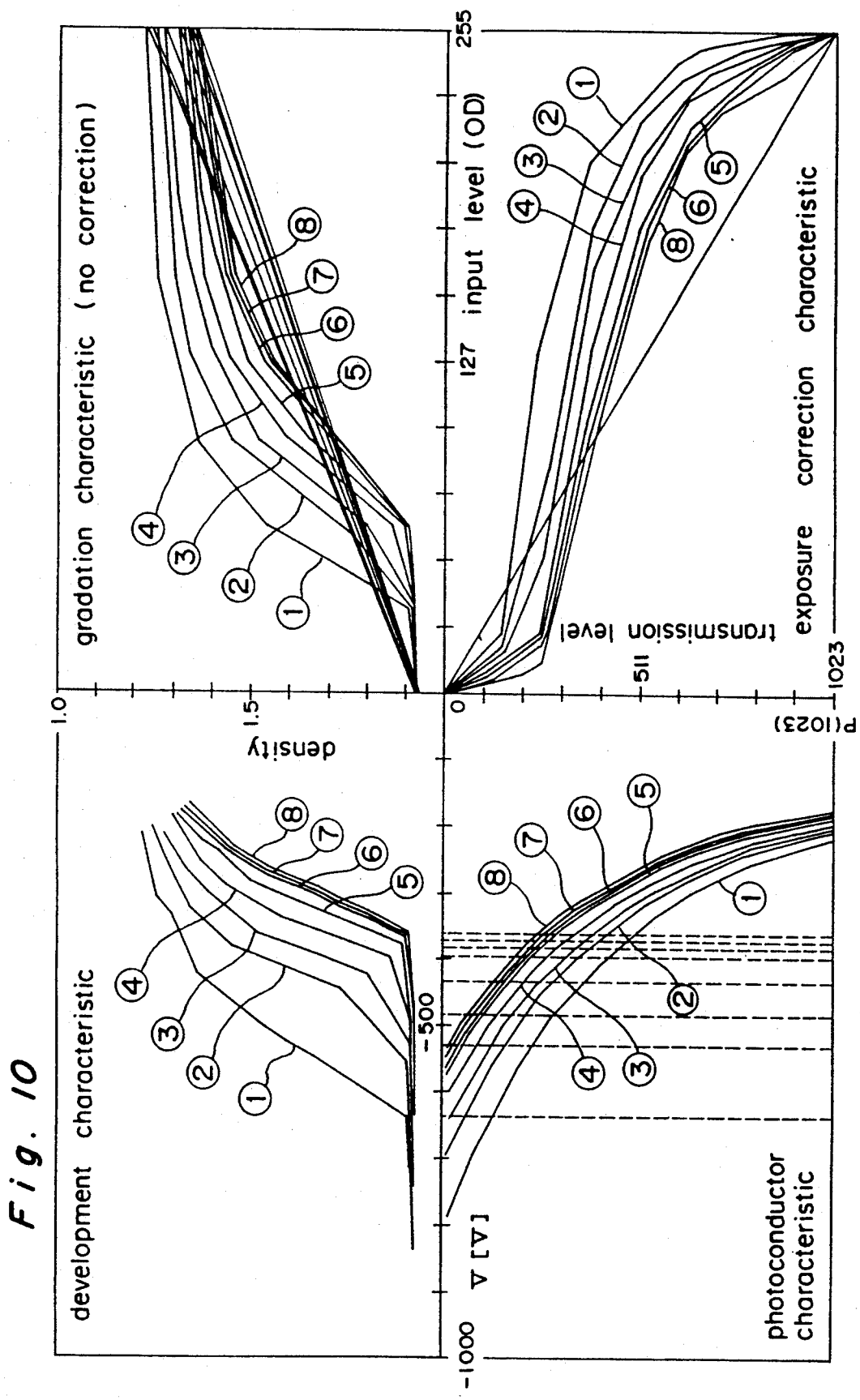
FIG. 10 is a graph of various characteristics when $V_B$ is changed with a constant $V_G$.

Further, FIG. 10 shows graphs of various characteristics under the conditions compiled in Table 3, that is, by changing the grid electric potential V$_G$ from −835 V to −565 V under the bias electric potential V$_B$ in a range from −835 V to −565 V in eight steps.

TABLE 2

| | P$_{min}$ (μJ/cm²) | P$_{max}$ (μJ/cm²) | V$_B$ (V) | V$_O$ (V) | V$_G$ (V) | V$_I$ (V) | V$_I$* (V) |
|---|---|---|---|---|---|---|---|
| 1 | .01 | 1.2 | −591 | −700 | −700 | −125 | −100 |
| 2 | .01 | 1.2 | −591 | −740 | −745 | −130 | −102 |
| 3 | .01 | 1.2 | −591 | −775 | −786 | −135 | −104 |
| 4 | .01 | 1.2 | −591 | −810 | −830 | −140 | −106 |
| 5 | .01 | 1.2 | −591 | −860 | −876 | −145 | −108 |
| 6 | .01 | 1.2 | −591 | −900 | −919 | 150 | −110 |

*exposed at 1.5 μJ/cm²

TABLE 3

| | P$_{min}$ (μJ/cm²) | P$_{max}$ (μJ/cm²) | V$_B$ (V) | V$_O$ (V) | V$_G$ (V) | V$_I$ (V) | V$_I$* (V) | β |
|---|---|---|---|---|---|---|---|---|
| 1 | .02 | 1.1 | 637 | 820 | 835 | 220 | 180 | 0.695 |
| 2 | .02 | 1.1 | 531 | 720 | 730 | 210 | 175 | 0.609 |
| 3 | .02 | 1.1 | 483 | 675 | 680 | 205 | 175 | 0.591 |
| 4 | .02 | 1.1 | 435 | 630 | 635 | 200 | 170 | 0.547 |
| 5 | .02 | 1.1 | 398 | 595 | 595 | 195 | 160 | 0.508 |
| 6 | .02 | 1.1 | 383 | 580 | 580 | 190 | 160 | 0.495 |
| 7 | .02 | 1.1 | 372 | 570 | 570 | 180 | 155 | 0.492 |
| 8 | .02 | 1.1 | 362 | 565 | 565 | 170 | 150 | 0.486 |

*exposed at 1.5 μJ/cm²

As shown in FIGS. 9 and 10, various kinds of characteristics can be controlled by changing the bias electric potential V$_B$ and the grid electric potential V$_G$.

The explanation of this embodiment will be continued by referring FIG. 8 again. When the photoconductor is exposed at a level L$_X$ by using a power P$_X$ of the laser diode 264, the electric potential of the photoconductor decreases to V$_X$, and then the deposition voltage ΔV$_X$ becomes |V$_B$−V$_X$|. Then, an amount ID$_X$ of toners is adhered to the photoconductor by the toner deposition.

In the automatic density control, the detection value V$_{AIDC}$ (an analog value) in correspondence with the amount ID$_X$ of toner deposition is supplied to the print controller 201. (The output characteristic is also nonlinear.) The print controller 201 determines the detection level LBA (0-28) according to the detection value V$_{AIDC}$, and selects the values of (V$_G$, V$_B$) corresponding to the detection level so as to keep the maximum density constant according to the data compiled in Table 1.

(d-2) integration of fog elimination and gradation control

However, if the values of (V$_G$, V$_B$) is changed only so as to keep the maximum density constant, the gradation characteristic changes as shown in FIGS. 9 and 10, so that the fidelity of the reproduction of a half-tone image will be deteriorated. For example, if the gradation characteristics is represented as the curve B in FIG. 8, when V$_G$ is increased, the amount of toners adhered will increase even if the power P$_X$ is kept constant, so that the gradation characteristic changes to the curve B$_1$.

Figure 11:
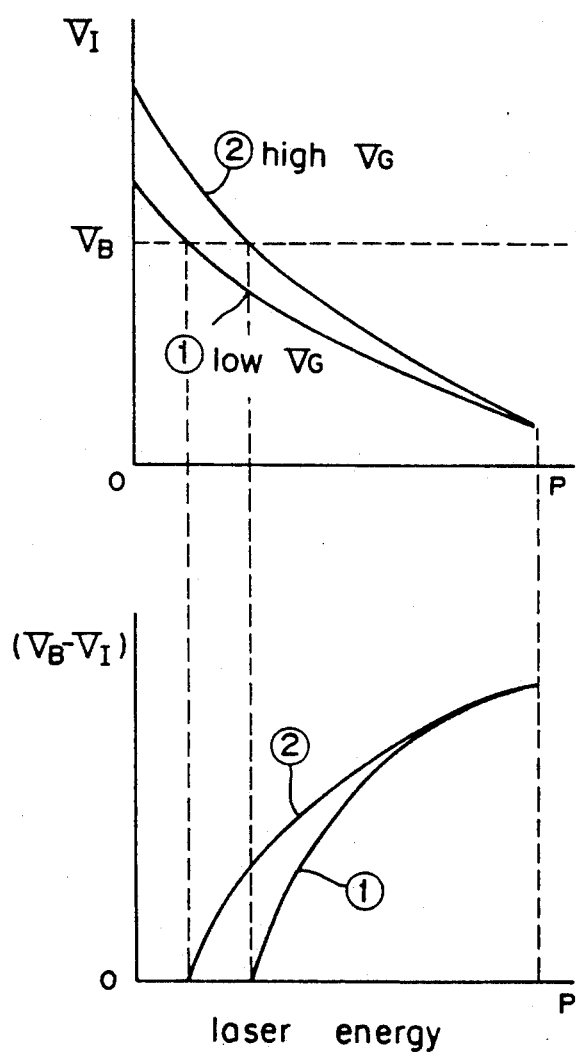
FIG. 11 is a graph of the decay electric potential and the development electric potential plotted against light-emitting energy.

For example, as shown in the upper side of FIG. 11, the decay electric potential V$_I$ of the photoconductor corresponding to the output power (laser energy) of the laser diode changes from 1 to 2 according to a change in the grid electric potential V$_G$, the development electric voltage |V$_B$−V$_2$| in relation with the amount of toners adhered changes from 1 to 2 as shown in the lower part of FIG. 11. The effect of the change in V$_G$ on the gradation is large especially at low densities. Therefore, if the reproduction of a half-tone image with high precision is wanted, especially of a half-tone color image, when the maximum density and the fog elimination are controlled, the gradation correction has to be performed integrally with the controls of the maximum density and the fog elimination, so as (a) to improve the nonlinearity existing originally in the toner development (the usual gamma correction), (b) to keep the gradation characteristic constant when the grid electric potential $V_G$ and the bias electric potential $V_B$ are changed for the automatic density control, and (c) to keep the gradation characteristic constant when the electrical potentials $V_G$ and $V_B$ are changed for eliminating fog.

In this embodiment, a user can select a fog input level (LBK) in four steps with the fog input switch 214, and the grid electric potential $V_G$ is changed according to the fog input level.

Figure 12:
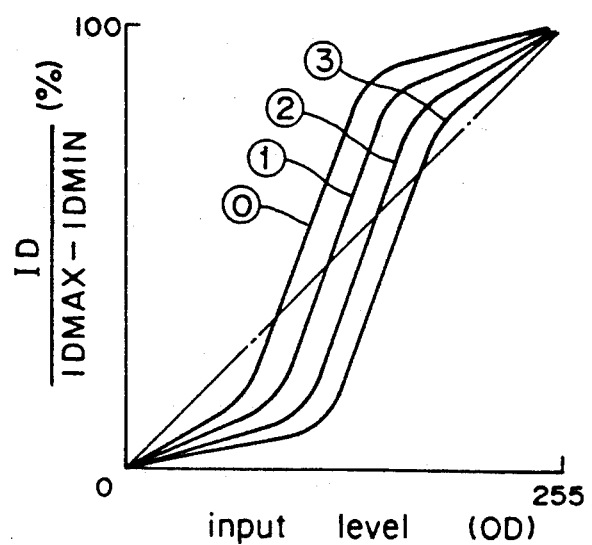
FIG. 12 is a graph of the change in gamma characteristic.
Figure 13:
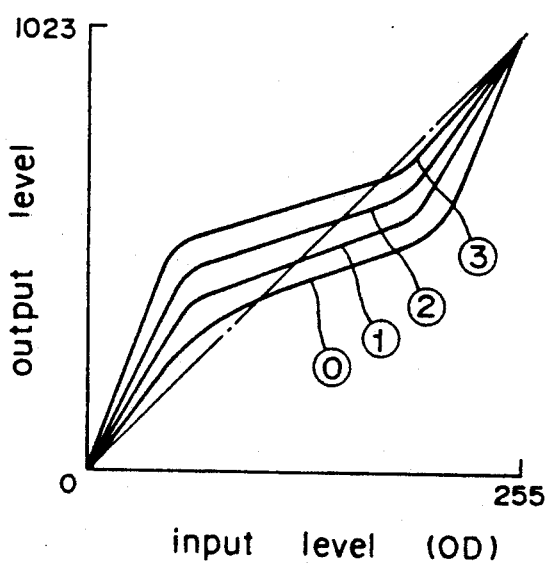
FIG. 13 is a graph of gamma correction curves.

As shown in FIG. 12 schematically, when the development voltage $|V_G-V_B|$ is changed successively according to the fog input level 0-3 under the same bias electric potential $V_B$, the rise of the output image density ID becomes less gradually and the gradation curve varies largely. (In FIG. 12, the output ID is normalized by the maximum and minimum values.) Therefore, the output ID varies largely when the input level (OD) is constant. Then, if the output level ID for the laser diode 264 is corrected as shown by curves 0-3 in FIG. 13, an ideal curve that, an output proportional to an input can be realized. In this embodiment, a plurality of gamma correction tables which represent the gradation correction data is stored in the data ROM 203 in correspondence with each values of $(V_B, V_G)$, as shown in the right column of Table 1, and the gamma correction part 253 selects a gamma correction table according to the selected values of $(V_G, V_b)$ and performs the gamma correction by referring the gradation correction data. In this example, the bias electric potential $V_B$ can be changed at 29 steps, and the grid electric potential $V_G$ can be changed at four steps for each $V_B$, so that gamma correction tables of $29 \times 4 = 116$ are stored in the data ROM 203.

Tables 4(a) and 4(b) show examples of gamma corrections. An input level of 0-255 is transformed into an output level (10-bit) of 0-1023. The gamma correction tables 4(a) and 4(b) correspond to 1 and 2 in FIG. 10, respectively. As will be explained later, an 8-bit data is transformed into a 10-bit data in order not to deteriorate the transformation precision in the gradation correction calculation.

TABLE 4

| (a) | | (b) | |
|---|---|---|---|
| OD | output level | OD | output level |
| 0 | 0 | 0 | 0 |
| 1 | 13 | 1 | 18 |
| 2 | 25 | 2 | 38 |
| 3 | 35 | 3 | 58 |
| 4 | 46 | 4 | 77 |
| 5 | 57 | 5 | 93 |
| 6 | 69 | 6 | 106 |
| 7 | 83 | 7 | 114 |
| 8 | 96 | 8 | 120 |
| 9 | 107 | 9 | 124 |
| 10 | 116 | 10 | 127 |
| 11 | 123 | 11 | 130 |
| 12 | 128 | 12 | 132 |
| . | . | . | . |
| 246 | 820 | 246 | 647 |
| 247 | 836 | 247 | 663 |
| 248 | 852 | 248 | 681 |
| 249 | 869 | 249 | 700 |
| 250 | 887 | 250 | 721 |
| 251 | 905 | 251 | 747 |

TABLE 4-continued

| (a) | | (b) | |
|---|---|---|---|
| OD | output level | OD | output level |
| 252 | 924 | 252 | 780 |
| 253 | 949 | 253 | 838 |
| 254 | 973 | 254 | 897 |
| 255 | 1023 | 255 | 1023 |

(d—3) broken line approximation

Previously, in order to transform a read-out density data OD (8bit) from 0 to 255 of an image into an output data of 0-255, output data in correspondence with each of the input volumes 0-255 are stored in the data ROM 203 (this data is called as a gamma correction table), and the data transformation is processed by referring the data ROM 203. Therefore, 256 data have to be stored in the data ROM 203. Further, different gamma correction tables have to be prepared for each different pair of the grid electric potential $V_G$ and the bias electric potential $V_B$. It is desirable that the number of the combination of $V_G$ and $V_B$ is large because the automatic density control and the fog elimination can be performed with good precision. However, if gradation correction data are stored for each pair of $V_G$ and $V_b$ which can be selected, a very large memory capacity is necessary to store the gradation correction data.

On the other hand, there is available a method which takes only the linearly changing part of the gamma characteristic. However, this method has bad reproducibility especially at low densities, and is not good for fog elimination.

Figure 14:
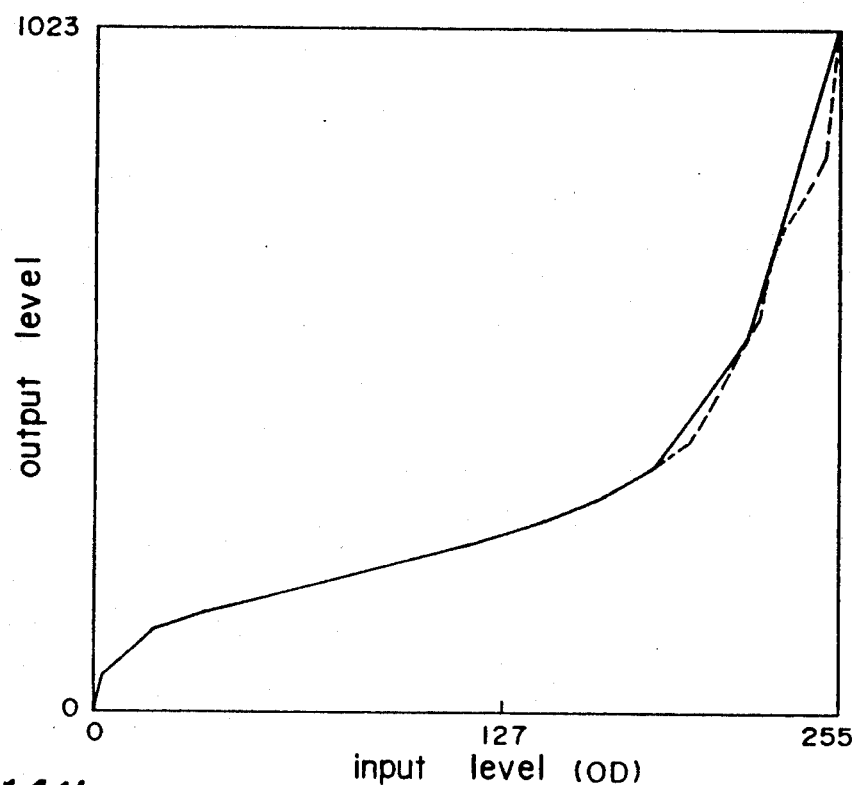
FIG. 14(a) and 14(b) are graphs of broken line approximation of gamma correction curve.
Figure 14:
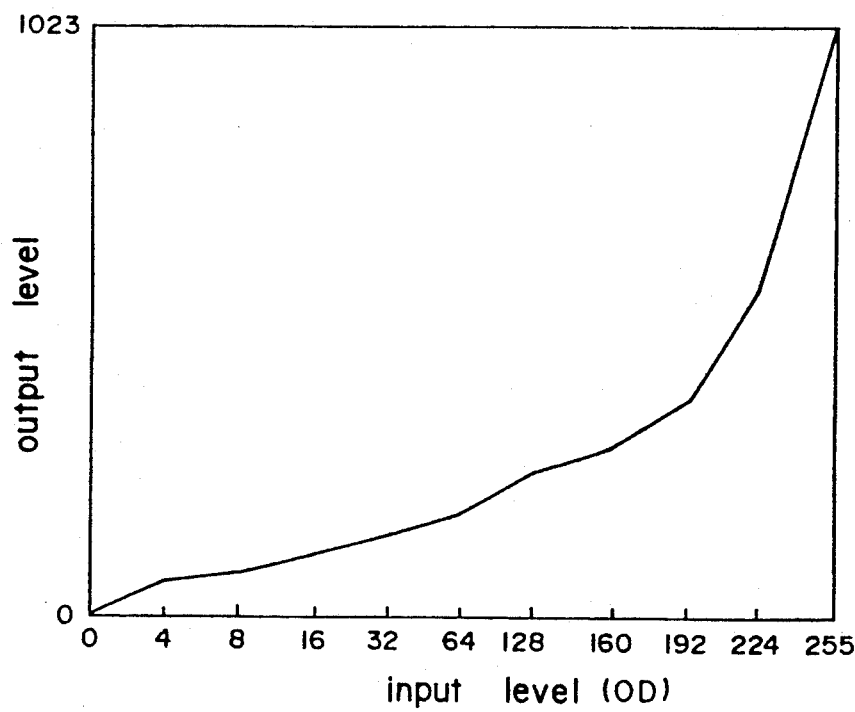

Then, in this embodiment, a broken line approximation is adopted as shown in FIG. 14 (a) and 14(b), wherein a dashed line in FIG. 14(a) represents the input level data as obtained. FIG. 14(a) shows a case wherein a broken line approximation is applied to the input level itself while the width of sections of input level is allowed to be variable, while FIG. 14(b) shows a case wherein a broken line approximation is applied by keeping the width of sections constant. It is preferable to approximate the gradation characteristic from its shape by dividing at least into three sections, that is, a low density section, a middle section wherein the density changes most steeply and a high density section. Therefore, it is preferable for approximation to use at least two intermediate points between each section. Then, in this embodiment, the gradation characteristic is approximated by using ten broken lines for ten sections of input level 0-255, and the approximated data are stored in the data ROM 203. Thus, the memory capacity can be decreased by a factor of about 1/10.

The eleven points for dividing the input level 0-255 into ten sections are selected so as to reproduce the low density part well. To be concrete, the points of (0, 4, 8, 16, 32, 64, 128, 160, 192, 224, 255) are selected, as shown in Table 5, wherein the number of the sections at low density are made large. In Table 5 are shown the gradient a(N) and the intercept b(N) for the ten sections (N=1-10) determined by the points. Tables 6(a) and 6(b) also show examples of broken line approximation with ten sections, wherein Tables 6(a) and 6(b) correspond with curves 1 and 2 in FIG. 9.

TABLE 5

| N | input level | a(N) | b(N) |
|---|---|---|---|
| 1 | 4 | 60 | 0 |
| 2 | 8 | 16 | 11 |

TABLE 5-continued

| N | input level | a(N) | b(N) |
|---|---|---|---|
| 3 | 16 | 16 | 11 |
| 4 | 32 | 8 | 19 |
| 5 | 64 | 5 | 24 |
| 6 | 128 | 5 | 22 |
| 7 | 160 | 6 | 14 |
| 8 | 192 | 102 | −27 |
| 9 | 224 | 24 | −195 |
| 10 | 255 | 59 | −685 |

TABLE 6

| N | input level | a(N) | b(N) |
|---|---|---|---|
| (a) | | | |
| 1 | 4 | 77 | 0 |
| 2 | 8 | 43 | 36 |
| 3 | 16 | 7 | 08 |
| 4 | 32 | 4 | 20 |
| 5 | 64 | 4 | 20 |
| 6 | 128 | 4 | 116 |
| 7 | 160 | 7 | 16 |
| 8 | 192 | 8 | −28 |
| 9 | 224 | 18 | −512 |
| 10 | 255 | 68 | −3312 |
| (b) | | | |
| 1 | 4 | 46 | 0 |
| 2 | 8 | 50 | −4 |
| 3 | 16 | 22 | 52 |
| 4 | 32 | 8 | 108 |
| 5 | 64 | 8 | 108 |
| 6 | 128 | 6 | 132 |
| 7 | 160 | 5 | 160 |
| 8 | 192 | 9 | −4 |
| 9 | 224 | 14 | −244 |
| 10 | 255 | 62 | −2932 |

Figure 30:
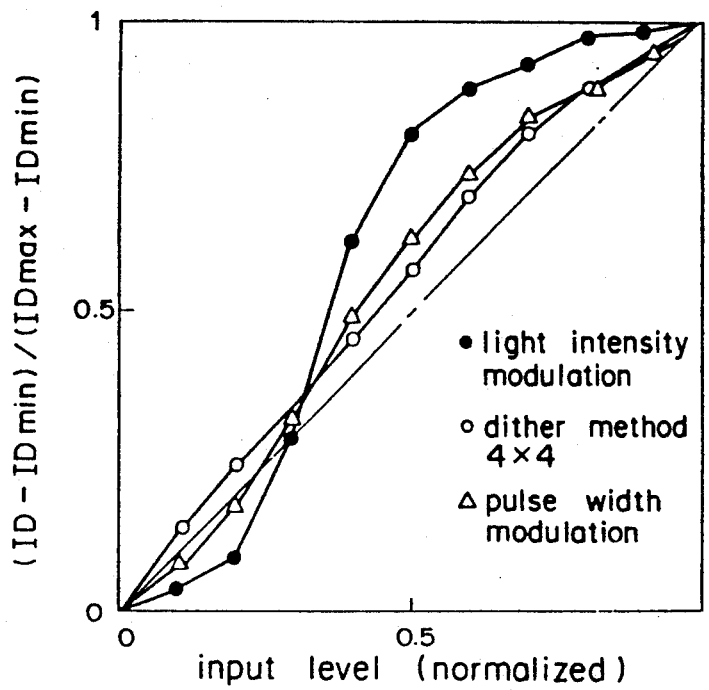
FIG. 30 is a graph for the comparison of gradation characteristics of various gradation expressions.

The gamma correction part 253 selects a gamma correction table stored in the data ROM 203 according to the detection value of the AIDC sensor 210, the color balance input value and the fog input value (refer FIG. 30). Then, when an input level x is received, the gamma correction part 253 reads the coefficients a(N) and b(N) of a section corresponding to the input level from the gamma correction table, and calculates a(N) * X+b(N) so as to supply the result Y. For example, in case of the gamma correction table of Table 5, if the input level is 50, the section N is fifth; then the coefficients a(5)=5 and b(5)=24 are read out to calculate the transformation level Y=a(5) *50+b(5).

If 8-bit calculation is performed in the broken line approximation, the transformation efficiency of the gradation characteristic decreases substantially less than one in a part of the largest gradient in the gradation characteristic because of rounding error. If the maximum gradient is four as in an example shown in the upper area of the right-hand side in FIG. 8, the transformation efficiency decreases to about 25% in a range of X between 25 and 125. Then, in this embodiment, gamma correction calculation is performed with ten bits which is larger by two bits than the bit number 8 of the input level X. Thus, even if the maximum gradient is four, the transformation efficiency does not decrease substantially by the calculation, so that the ideal gradation characteristic of the maximum gradient is one. In other words, if a ratio of the output gradation number to the input gradation number is made almost equal to or larger than the maximum gradient, the output value changes always for a change in one step in the input level X, so that the gradation number does not decrease owing to the gamma correction calculation.

Though a broken line approximation is adopted above, other approximations which can decrease the number of gradation correction data can also be used. In such a case, the data which represent the approximate expression are stored in the data ROM 203, as in case of broken line approximation.

(d-4) gradation correction with use of final correction addition according to fog elimination level In a modified embodiment for decreasing the number of gradation correction data stored in the data ROM 203, the gradation correction data are corrected according to the fog elimination level (LBK).

A change in the grid electric potential $V_G$ due to the fog elimination level is small when compared with the grid electric potential itself, it is a good approximation that the gradation correction caused by a change in $V_G$ for each ($V_B$, $V_G$) is almost the same. Therefore, it is a good approximation to perform the addition correction as to a change in the gradation correction and this makes the memory capacity smaller.

Then, a gradation correction table is stored in the data ROM 203 for each pair of ($V_B$, $V_G$) of the bias electric potential $V_B$ and the grid electric potential $V_G$ for the automatic density control and the gradation control corresponding to automatic density control. Further, an addition correction table is also stored in the data ROM 203 for each fog input level 1, 2, 3 step by the fog input switch 214. In case of 0 of fog input level, such an addition correction table is not prepared, so that the correction for the gradation correction table is not performed. Thus, the output values of the gradation correction table and the addition correction table are added as to the same read-out density (OD) so as to supply a transformation level to be corrected finally. Therefore, if a pair of ($V_B$, $V_G$) is changed at 29 steps, only 29+3=32 of gamma correction tables need to be stored in the data ROM 203. This means that the number of the gamma correction tables or the memory capacity can be decreased by a factor of about ¼ when compared with a case of 29×4=116 of gamma correction tables.

In table 7, α1, α2 and α3 show examples of addition correction tables for fog elimination levels (LBK)=1, 2, and 3, respectively. If the table A0 shown in Table 8 is a gamma correction table selected according to ($V_B$, $V_G$) values, the results of the correction by adding the gamma correction table with the addition correction table α1, α2 and α3 become the transformed level Y shown in tables A1, A2 and A3, respectively.

TABLE 7

| addition correction table | | | | | |
|---|---|---|---|---|---|
| α1 | | α2 | | α3 | |
| X | Z | X | Z | X | Z |
| 0 | 0 | 0 | 0 | 0 | 0 |
| 1 | 5 | 1 | 12 | 1 | 14 |
| 2 | 12 | 2 | 20 | 2 | 24 |
| 3 | 17 | 3 | 25 | 3 | 30 |
| 4 | 21 | 4 | 28 | 4 | 35 |
| 5 | 24 | 5 | 30 | 5 | 40 |
| 6 | 24 | 6 | 31 | 6 | 42 |
| 7 | 25 | 7 | 31 | 7 | 44 |
| 8 | 26 | 8 | 33 | 8 | 47 |
| 9 | 26 | 9 | 33 | 9 | 49 |
| 10 | 26 | 10 | 33 | 10 | 52 |
| 11 | 26 | 11 | 33 | 11 | 54 |
| 12 | 25 | 12 | 32 | 12 | 56 |
| 13 | 25 | 13 | 32 | 13 | 57 |
| 14 | 25 | 14 | 32 | 14 | 59 |
| 15 | 23 | 15 | 32 | 15 | 60 |
| 16 | 23 | 16 | 32 | 16 | 62 |
| 17 | 23 | 17 | 32 | 17 | 64 |

TABLE 7-continued addition correction table

| α1 | | α2 | | α3 | |
|---|---|---|---|---|---|
| X | Z | X | Z | X | Z |
| 18 | 23 | 18 | 33 | 18 | 66 |
| 19 | 23 | 19 | 33 | 19 | 68 |
| 20 | 22 | 20 | 33 | 20 | 69 |
| 21 | 22 | 21 | 33 | 21 | 70 |
| 22 | 21 | 22 | 32 | 22 | 69 |
| 23 | 21 | 23 | 32 | 23 | 69 |
| 24 | 21 | 24 | 32 | 24 | 70 |
| 25 | 20 | 25 | 33 | 25 | 70 |
| . | . | . | . | . | . |
| . | . | . | . | . | . |
| . | . | . | . | . | . |
| 255 | 0 | 255 | 0 | 255 | 0 |

TABLE 8

| table A0 | | table A1 | | table A2 | | table A3 | |
|---|---|---|---|---|---|---|---|
| X | Y | X | Y | X | Y | X | Y |
| 0 | 0 | 0 | 0 | 0 | 0 | 0 | 0 |
| 1 | 12 | 1 | 16 | 1 | 23 | 1 | 25 |
| 2 | 19 | 2 | 31 | 2 | 39 | 2 | 43 |
| 3 | 25 | 3 | 42 | 3 | 50 | 3 | 55 |
| 4 | 29 | 4 | 50 | 4 | 57 | 4 | 64 |
| 5 | 31 | 5 | 55 | 5 | 61 | 5 | 71 |
| 6 | 34 | 6 | 58 | 6 | 65 | 6 | 76 |
| 7 | 36 | 7 | 61 | 7 | 67 | 7 | 80 |
| 8 | 37 | 8 | 63 | 8 | 70 | 8 | 84 |
| 9 | 39 | 9 | 65 | 9 | 72 | 9 | 88 |
| 10 | 40 | 10 | 66 | 10 | 73 | 10 | 92 |
| 11 | 41 | 11 | 67 | 11 | 74 | 11 | 95 |
| 12 | 43 | 12 | 68 | 12 | 75 | 12 | 98 |
| 13 | 44 | 13 | 69 | 13 | 76 | 13 | 101 |
| 14 | 45 | 14 | 70 | 14 | 77 | 14 | 104 |
| 15 | 47 | 15 | 70 | 15 | 79 | 15 | 107 |
| 16 | 48 | 16 | 71 | 16 | 80 | 16 | 110 |
| 17 | 49 | 17 | 72 | 17 | 81 | 17 | 113 |
| 18 | 50 | 18 | 73 | 18 | 83 | 18 | 116 |
| 19 | 51 | 19 | 74 | 19 | 84 | 19 | 119 |
| 20 | 52 | 20 | 74 | 20 | 85 | 20 | 121 |
| 21 | 53 | 21 | 75 | 21 | 86 | 21 | 123 |
| 22 | 55 | 22 | 76 | 22 | 87 | 22 | 124 |
| 23 | 56 | 23 | 77 | 23 | 88 | 23 | 125 |
| 24 | 57 | 24 | 78 | 24 | 89 | 24 | 127 |
| 25 | 58 | 25 | 78 | 25 | 91 | 25 | 128 |
| . | . | . | . | . | . | . | . |
| . | . | . | . | . | . | . | . |
| . | . | . | . | . | . | . | . |
| 255 | 1023 | 255 | 1023 | 255 | 1023 | 255 | 1023 |

In order to decrease the memory of the gradation correction data further, the above-mentioned broken line approximation can be used. In this case, the data of the broken line approximation selected according to ($V_B$, $V_G$) are stored as gamma correction tables in the data ROM 203. Thus, the final correction calculation in the actual gradation correction is performed as to the transformed level data from the gamma correction table.

(d-5) selection of gradation correction data with use of $\beta$ code

In the above-explained method, $4 \times 29 = 116$ of gamma correction tables have to be stored in the data ROM 203 because $V_G$ (for fog elimination) changes at four step and $V_B$ (for density control) changes at 29 steps. Then, in a modified embodiment, the number of the gamma tables will be decreased as will be explained below.

There are many gradation characteristics similar to each other among many combinations of ($V_B$, $V_G$). If the difference between $V_B$ and $V_G$ becomes smaller, the number of similar gradation characteristics will increase. Therefore, if such many gradation characteristics can be classified by using a suitable parameter for similar gradation characteristics, the number of gamma correction tables can be decreased by assigning a parameter beforehand for each pair of ($V_B$, $V_G$).

The gradation characteristic is almost determined by a parameter $\beta$ defined as $(V_B - V_I)/(V_O - V_I)$ to be calculated from the bias electric potential $V_B$, the surface electric potential $V_O$ and the decay electric potential $V_I$ at the maximum light intensity of the laser output level 255. Thus, $\beta$ is suitable as the above-mentioned parameter. The various characteristics are affected by a change in ($V_G$, $V_B$) as shown in FIGS. 9 and 10 (refer table 3). Then, $\beta = (V_B - V_I)/(V_O - V_I)$ is determined beforehand by measuring the surface electric potential $V_O$ and the decay electric potential $V_I$ at the maximum light intensity for each ($V_G$, $V_B$) to be selected. Table 9 shows the obtained results and $\beta$ codes (0–51) corresponding with them. The $\beta$ codes are defined for $\beta$ values from 0.420 to 0.939 divided into sections of 0.010 pitch, as shown in Table 10. Next, most suitable gamma correction data are stored for each $\beta$ code. Therefore, only 51 gamma correction tables are needed, so that the memory capacity can be decreased by a factor of about ½ when compared with the above-mentioned example. If the pitch of section is made coarser, the memory capacity of the gamma correction data can be decreased further.

TABLE 9

| NO | $V_B$ | $V_{G0}$ | $V_O$ | $V_I$ | $\beta$ | $\beta$ code | $V_{G1}$ | $V_O$ | $V_I$ | $\beta$ | $\beta$ code | $V_{G2}$ | $V_O$ | $V_I$ | $\beta$ | $\beta$ code | $V_{G3}$ | $V_O$ | $V_I$ | $\beta$ | $\beta$ code |
|---|---|---|---|---|---|---|---|---|---|---|---|---|---|---|---|---|---|---|---|---|---|
| 0 | 250 | 400 | 400 | 100 | 0.500 | 9 | 420 | 420 | 100 | 0.484 | 7 | 440 | 475 | 105 | 0.439 | 2 | 460 | 450 | 105 | 0.420 | 1 |
| 1 | 270 | 420 | 420 | 100 | 0.531 | 12 | 440 | 435 | 105 | 0.500 | 9 | 460 | 450 | 105 | 0.478 | 6 | 480 | 470 | 105 | 0.452 | 4 |
| 2 | 290 | 440 | 435 | 105 | 0.561 | 15 | 460 | 450 | 105 | 0.536 | 12 | 480 | 470 | 105 | 0.507 | 9 | 500 | 485 | 110 | 0.493 | 8 |
| 3 | 310 | 460 | 450 | 105 | 0.394 | 19 | 480 | 470 | 105 | 0.562 | 15 | 500 | 485 | 110 | 0.533 | 12 | 520 | 505 | 110 | 0.506 | 9 |
| 4 | 330 | 480 | 470 | 105 | 0.616 | 20 | 500 | 485 | 110 | 0.587 | 17 | 520 | 505 | 110 | 0.553 | 94 | 540 | 520 | 115 | 0.534 | 2 |
| . | | | | | | | | | | | | | | | | | | | | | |
| . | | | | | | | | | | | | | | | | | | | | | |
| 28 | 810 | 960 | 860 | 160 | 0.929 | 51 | 980 | 880 | 160 | 0.903 | 49 | 1000 | 900 | 165 | 0.814 | 47 | 1020 | 915 | 165 | 0.867 | 45 |

TABLE 10

| $\beta$ code | $\beta$ | $\beta$ code | $\beta$ | $\beta$ code | $\beta$ | $\beta$ code | $\beta$ | $\beta$ code | $\beta$ | $\beta$ code | $\beta$ |
|---|---|---|---|---|---|---|---|---|---|---|---|
| 1 | 0.420~0.429 | 11 | 0.520~0.529 | 21 | 0.620~0.629 | 31 | 0.720~0.729 | 41 | 0.820~0.829 | 51 | 0.920~0.929 |
| 2 | 0.430~0.435 | 12 | 0.530~0.539 | 22 | 0.630~0.639 | 32 | 0.730~0.739 | 42 | 0.830~0.839 | | |
| 3 | 0.440~0.449 | 13 | 0.540~0.549 | 23 | 0.640~0.649 | 33 | 0.740~0.749 | 43 | 0.840~0.849 | | |

TABLE 10-continued

| β code | β | β code | β | β code | β | β code | β | β code | β | β code | β |
|---|---|---|---|---|---|---|---|---|---|---|---|
| . | | . | | . | | . | | . | | | |
| . | | . | | . | | . | | . | | | |
| . | | . | | . | | . | | . | | | |
| 9 | 0.500~0.509 | 19 | 0.600~0.609 | 29 | 0.700~0.709 | 39 | 0.800~0.809 | 49 | 0.900~0.909 | | |
| 10 | 0.510~0.519 | 20 | 0.610~0.619 | 30 | 0.710~0.719 | 40 | 0.810~0.819 | 50 | 0.910~0.919 | | |

In the actual correction calculation, β code is selected from Table 9 according to the selected $V_G$ and $V_B$, the gamma correction table in correspondence with the β code is read from the data ROM 203, and the output data for light-emitting is supplied by using the gamma correction table.

Still further, if the above-explained broken line approximation is used for the gamma correction table, the memory capacity of the gamma correction data can be decreased further.

(e) power control of laser diode (e-1) temperature change and correction of the maximum light intensity In photoconductors such as organic conductors, the sensitivity characteristic (decay curve of the surface electric potential) against the light-emitting level of the laser diode 264 varies with temperature. If the gradation is expressed by modulating the light-intensity of the laser diode 264 to such a photoconductor, the fidelity of the reproduction of gradation varies with temperature. Further, if the maximum density is controlled according to the measured amount of the adhered toners of a standard toner image formed on the photoconductor with the AIDC sensor 210, the standard itself of the measurement of the amount of the adhered toners varies with the temperature so as to worsen the measurement precision. Thus, the development characteristic cannot be corrected well. Similarly, the gradation cannot be kept constant according to such a measured value by the AIDC sensor 210. Still farther, even if the measurement of the standard density can be performed well, the image density cannot be reproduced well due to a change in the development characteristic.

Another problem to be dealt with is the lot dependence of the sensitivity of the photoconductor. Even among the photoconductors made of the same material, the sensitivity characteristic, that is, the decay of the surface electric photoconductor for the exposure of laser diode may vary with a lot of the manufacture. In such a case, if a lot of a photoconductor is changed, the density of the reproduced image may vary even at the same signal of the density to be read out, and the gradation characteristic may vary to lower the fidelity of the reproduction of the image. Therefore, the gradation may not be expressed with good fidelity.

Then, in this embodiment, the maximum light intensity is controlled according to the surface temperature of the photoconductor in order to express the density and the gradation with fidelity when the sensitivity characteristic of the photoconductor changes.

Figure 15:
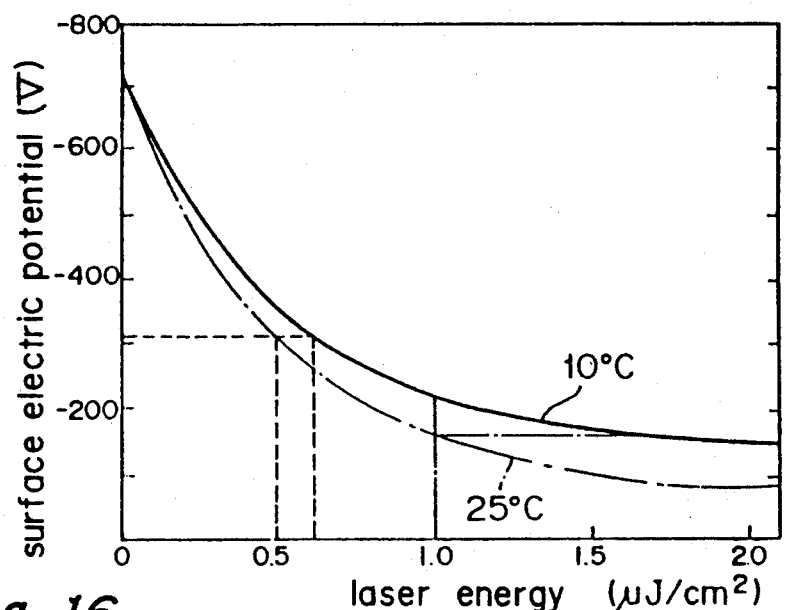
FIG. 15 is a graph which shows a temperature change in the electric potential on the photoconductor plotted against the out power.

FIG. 15 shows the sensitivity characteristics of the photoconductor at 10° C. (low temperature) and at 25° C. (room temperature). (The humidity is kept all at 55% RH.) The surface electric potential at 10° C. is lower when compared with that at 25° C. For example, the half-decay light intensity which makes the surface electric potential a half needs 0.5 $\mu J/cm^2$ of laser energy at 25° C. as shown by a dashed line, whereas it needs 0.62 $\mu J/cm^2$ of laser energy at 25° C.; that is, the sensitivity decreases by about 20%.

Figure 16:
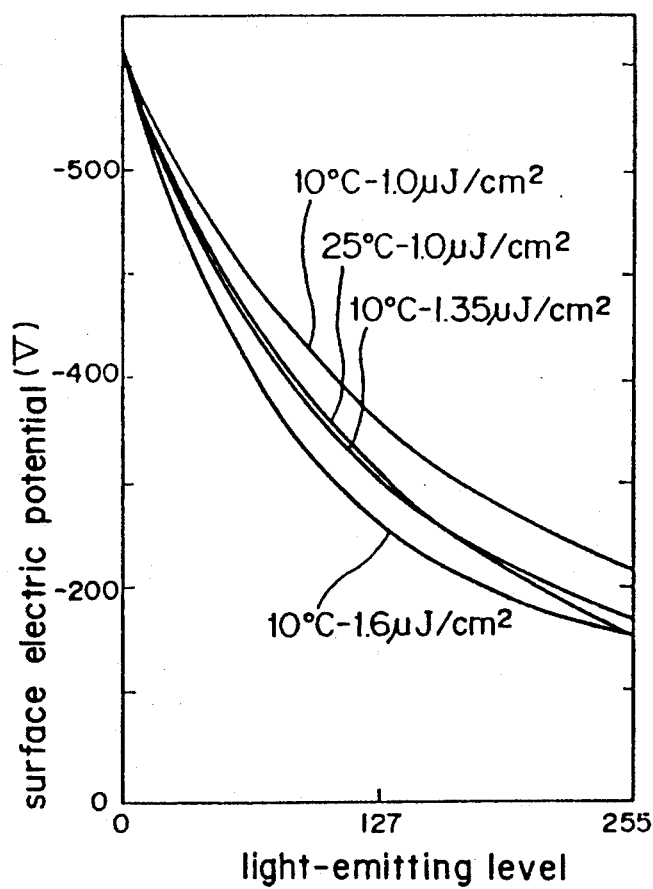
FIG. 16 is a graph which shows a change in the electric potential on the photoconductor plotted against the light-emitting level.

FIG. 16 shows the decay of the surface electric potential when the light-emitting energy of the laser diode 264 is changed at 10° C. and at 25° C. It is found that the decay of the surface electric potential is almost the same at the maximum level 255 in two cases when the light-emitting energy is 1.6 $\mu J/cm^2$ at 10° C. and when it is 1.0 $\mu J/cm^2$ at 25° C., while the decay at 10° C. is rather large at intermediate levels. Thus, the temperature change at each level is large as a whole.

However, if the light-emitting energy is set to be 1.35 $\mu J/cm^2$ at 10° C., the surface electric potential becomes almost the same in the whole light-emitting level (output level) though it is a little larger at level 255, when compared with the case of 1.0 $\mu J/cm^2$ at 25° C. That is, the sensitivity characteristic at the two temperatures become almost similar to each other.

Figure 17:
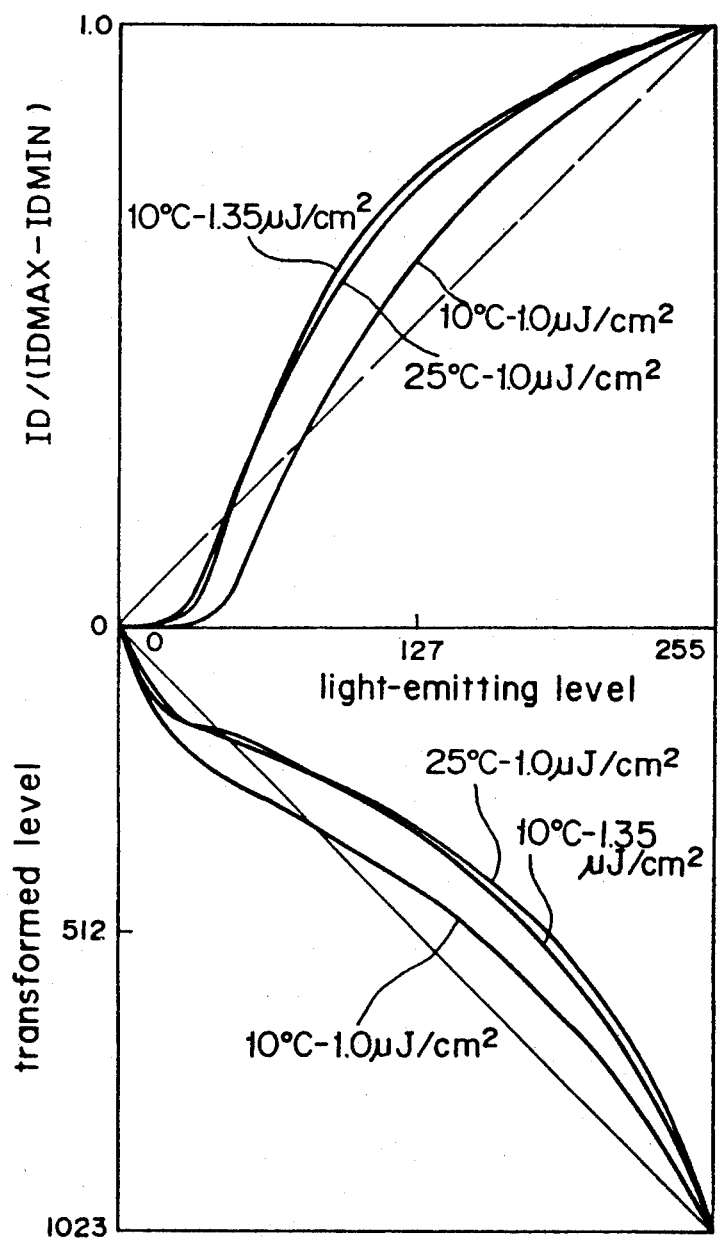
FIG. 17 is a graph which shows the gradation correction and the exposure correction characteristics plotted against the light-emitting level.

FIG. 17 shows the gradation characteristic at the upper side and the transformed level against the light-emitting energy at the maximum level 255 is set to be 1.35 $\mu J/cm^2$ at 10° C., when compared with the case of 1.0 $\mu J/cm^2$ at the maximum level at 25° C., the normalized gradation characteristics of the two cases become almost the same as shown in the upper side, while the transformed characteristics of the light-emitting level for making the gradation characteristic linear against the light-emitting level also become almost the same as shown in the lower side.

Therefore, it is apparent that almost the same gradation characteristic can be realized for a print at 10° C. by increasing the light-emitting energy to 1.35 $\mu J/cm^2$ at level 255.

Similarly, at other temperatures, the decay curve of the surface electric potential $V_I$ can be made the same by controlling the maximum light-intensity at level 255. Then, the development electric potential $|V_B - V_I|$ is kept the same irrespectively of temperature, so that the gradation characteristic is kept the same and the development characteristic becomes stable when the temperature changes.

Figure 21:
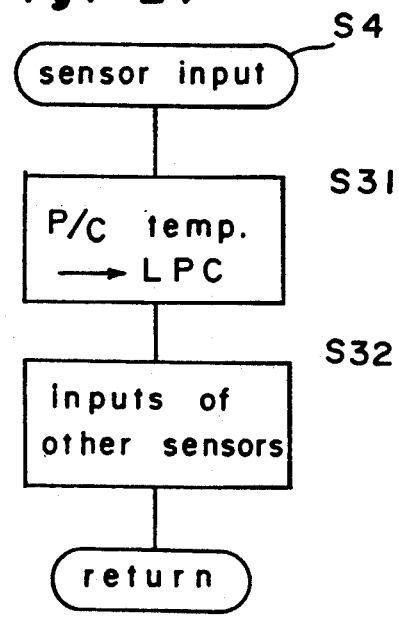
FIG. 21 is a flowchart of the sensor input processing.

In this embodiment, a temperature range is divided beforehand into sections in correspondence with a plurality of levels of light-emitting energy of the maximum light intensity, for example as shown in Table 11, and each section is designated by a photoconductor temperature code LPC, which is determined and stored according to the temperature detected by the temperature sensor 212 (refer a flow in FIG. 21).

TABLE 11

| temperature range | laser diode power | LPOW |
|---|---|---|
| $T > T_0$ | 1.0 mW | 0 |
| $T_0 \geq T > T_1$ | 1.1 | 1 |
| $T_1 \geq T > T_2$ | 1.2 | 2 |
| $T_2 \geq T > T_3$ | 1.3 | 3 |
| $T_3 \geq T > T_4$ | 1.4 | 4 |

TABLE 11-continued

| temperature range | laser diode power | LPOW |
|---|---|---|
| $T_4 \geq T > T_5$ | 1.5 | 5 |
| $T_5 \geq T > T_6$ | 1.6 | 6 |
| $T_6 \geq T$ | 1.7 | 7 |

On the other hand, the sensitivity characteristic of a photoconductor is also different among lots of photoconductors. Then, a three-bit photoconductor lot code (LLOT) is a signed to the photoconductor drum 41. This code is determined so as to correspond with a difference of 0.1 mW of the maximum light-emitting energy. Thus, the sum of the two codes LLOT and LPC is called as a power code LPOW (Table 11, refer a flow in FIG. 23). The power code LPOW is 7 if the sum is more than seven. However, if the bit number of the power code LPOW is increased more than three, the maximum value can be increased. If the power code LPOW determined as explained above is supplied as a level set value to the gain change signal generator 256 (FIG. 4) of the gain change circuit 255, only a switch corresponding to the level set value is turned on so as to set the gain. Thus, the maximum light-intensity is controlled by the gain change circuit 255 according to a change in the surface temperature so as to keep the sensitivity characteristic of the photoconductor constant. Then, the gradation characteristic is stabilized against a temperature change.

Figure 20:
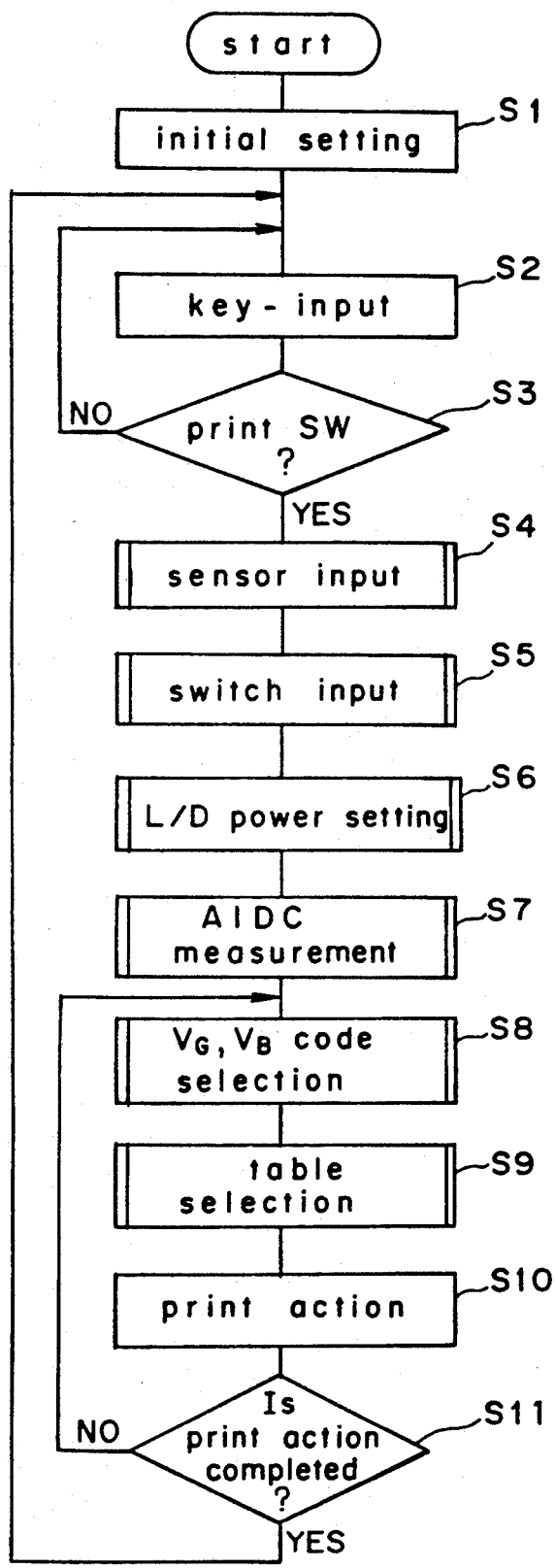
FIG. 20 is a main flowchart of the print controller.

Further, after the maximum light-intensity of the laser diode 264 is controlled as explained above, the density control by using the AIDC sensor 210 is performed (FIG. 20 S6-S7). Therefore, in the detection by the AIDC sensor 210, the surface electric potential in the exposure area of the standard toner image becomes constant, so that only a change in the development characteristic can be detected. Thus, the automatic density control can be performed at a high precision.

Still further, when the gradation is corrected by controlling the grid electric potential $V_G$ and the bias electric potential $V_B$ according to a detection signal of the AIDC sensor 210, the decay curve of the photoconductor is kept almost the same, so that the gradation at intermediate levels can be reproduced with good precision even if the temperature changes.

(e-2) fog elimination and gradation control

In the formation of a standard toner image at an intermediate density level for the detection of the amount of toners adhered with the AIDC sensor 210, the standard values of ($V_G$, $V_B$) for forming the standard toner image can be changed according to the fog elimination level (LBK) set by an operator. As explained above, the light-emitting level is transformed for gradation correction so as not to change the whole gradation characteristic for fog elimination while keeping the maximum light intensity constant by changing ($V_G$, $V_B$). However, the development voltage of the detection value of the AIDC sensor 210 changes for each ($V_G$, $V_B$) on the formation of the standard toner image in such a precision of the gradation correction control. Therefore, correct information on the amount of the adhered toners cannot be obtained. Thus, if the fog elimination level changes, the gradation correction cannot be performed precisely.

Figure 18:
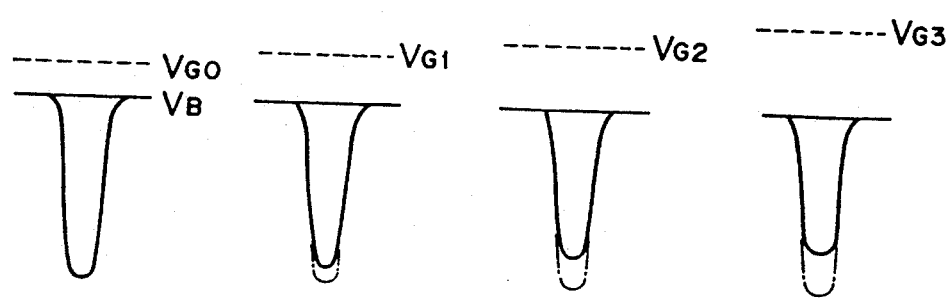
FIG. 18 is a graph of a change in the electric potential of the photoconductor caused by a change in the grid electric potential $V_G$.
Figure 19:
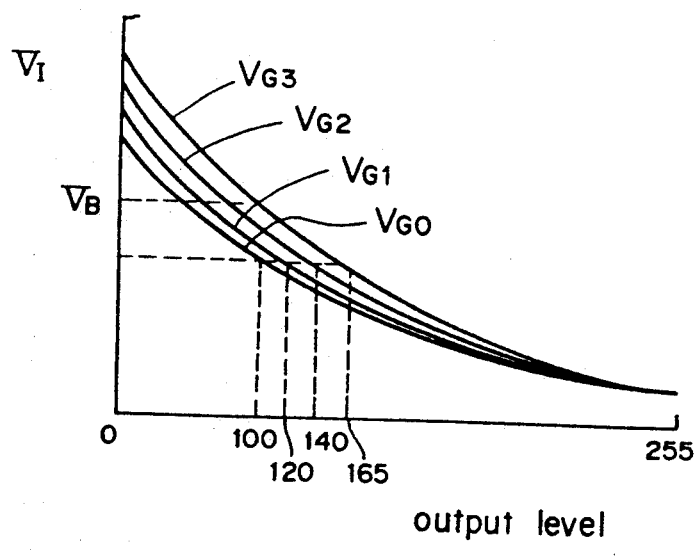
FIG. 19 is a graph of the electric potential of the photoconductor when the grid electric potential $V_G$ is changed.

Then, in this embodiment, besides the gradation correction, the light intensity of the laser diode 264 is changed according to the fog elimination level to be set with the fog input switch 214, when a standard toner image is formed for the detection at the amount of the adhered toners by the AIDC sensor 210. That is, as to the values of ($V_B$, $V_G$) for forming a standard toner image, the bias electric potential $V_B$ is kept constant while the grid electric potential $V_G$ is changed in four steps according to the fog elimination level (LBK). However, if the output power of the laser diode 264 for forming the standard toner image is kept the same, the decay electric potential $V_I$ of the photoconductor changes with $V_G$, as shown by solid lines in FIG. 18. Then, the output power of the laser diode 264 is controlled so that the decay electric potential $V_I$ becomes constant or the development electric voltage $\Delta V = |V_B - V_I|$ becomes constant. For example, as shown in FIG. 19, though the decay electric potential $V_I$ changed according to the grid electric potential $V_G$, the development electric voltage $|V_B - V_I|$ can be kept constant if the output level at the grid electric potential of $V_{G1}$, $V_{G2}$, and $V_{G3}$ is set to be 120, 140 and 165 when the output level for the minimum output level is 100. Therefore, it is preferable to expose the photoconductor at an output level in correspondence with the selected grid electric potential $V_G$, on forming the standard toner image. Because the amount of the adhered toners of the standard toner image can be kept constant, the standard toner image can be formed at the same gradation value, and the density can be controlled according to a correct detection value even if the fog elimination level varies, thus, the precision of the automatic density controlls improved.

(f) flow of print control

A flow of the print control of the print controller 201 will be explained below.

FIG. 20 shows a flow of the main flow of the print controller 201. First, the initial values are set (step S1). Next, a key-input of the print switch key of the operational panel 221 is waited (steps S2 and S3). If a key-input of the print switch key is accepted (YES at step S3), data of each sensor is processed (step S4, refer FIG. 21), switch-inputs are processed (step S5, refer FIG. 22), the power of the laser diode 264 is set (step S6, refer FIG. 23), the measurement with the AIDC sensor 211 is performed (step S7, refer FIG. 24), the $V_G$, $V_B$ code is selected (step S8, refer FIG. 25), and a gamma correction table is selected (step S6, refer FIG. 26) successively, and the print action is carried out (step S10). Then, it is decided if the print action completes or not (step S11). If the print action does not complete, the flow returns to step S8, otherwise it returns to step S2.

FIG. 21 shows the flow of the sensor input processing (step S4). First, the temperature of the photoconductor detected by the temperature sensor 212 is received, and a 3-bit photoconductor temperature code LPC of the detected value is stored according to Table 11 (step S31). Further, the data detected by other sensors are stored (step S32), and the flow returns to the main flow.

Figure 22:
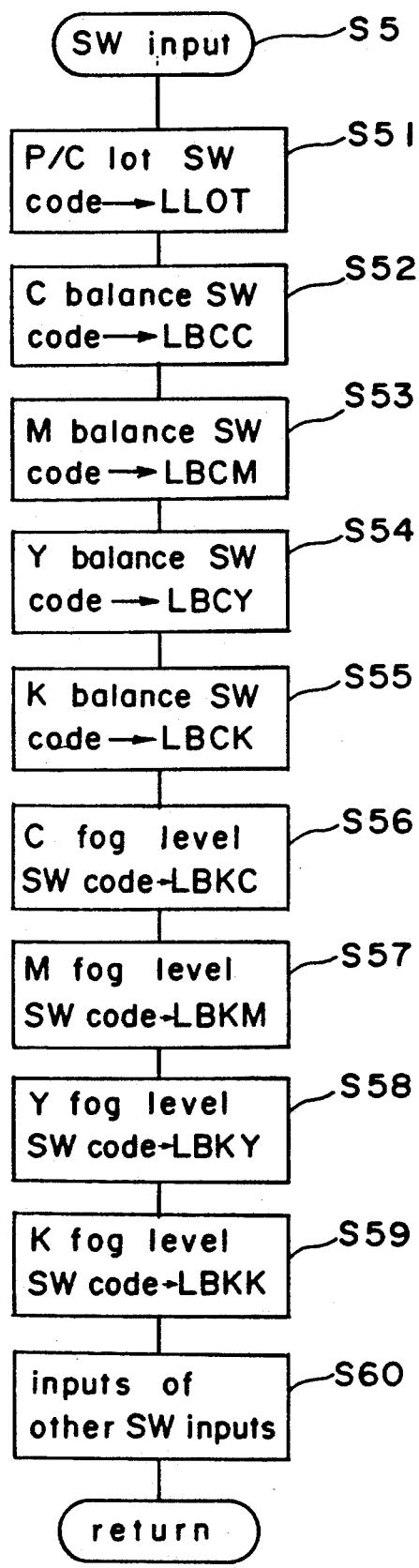
FIG. 22 is a flowchart of switch-input processing.

FIG. 22 shows the flow of the switch input processing (step S5). First, the photoconductor lot switch code is received from the P/C lot switch (a 3-bit DIP switch) 218 to be stored in the data ROM 203 as the photoconductor lot code LLOT (step S51). This code may also be inputted by reading a mark such as a bar code put on the photoconductor drum 41. Next, color balance switch codes of cyan (c), magenta (M), yellow (Y) an blank (K) are received from the color balance switches 216 of each color, and are stored as codes LBCC, LBCM, LBCY and LBCK (step S52-S55). Then, fog level switch codes of cyan, magenta (M), yellow (Y) and black (K) are received from the fog input switches 215 of each color, and are stored as codes LBKC, LBKM, LBKY and LBKK (steps S56–S59). Next, switch inputs of other switches are received, and stored (step S60). Then, the flow returns to the main flow.

Figure 23:
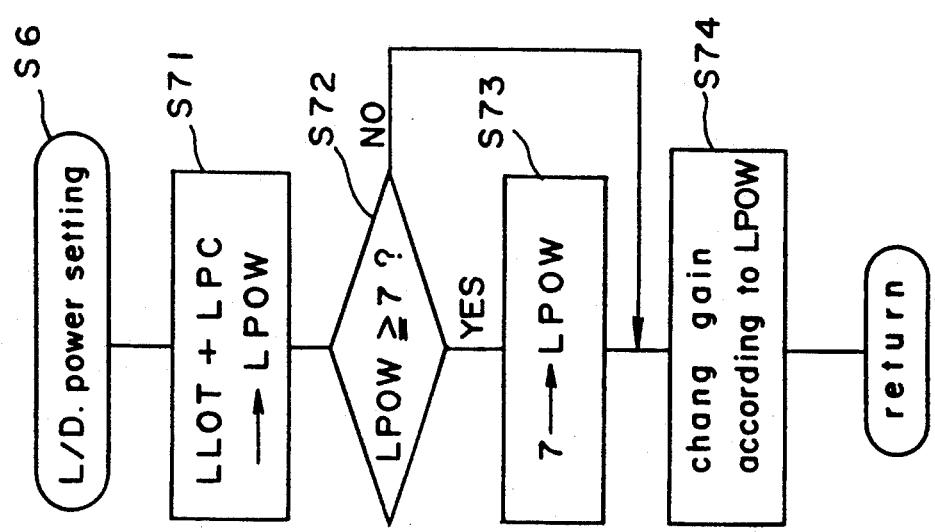
FIG. 23 is a flowchart of laser diode power setting processing.

FIG. 23 shows the flow of the laser diode power setting processing (step S6). First, LLOT (photoconductor lot switch, refer step S51) and LPC (photoconductor temperature code, refer S31) are added to be stored as a 3-bit power code (LPOW) (step S71). Next, it is decided if LPOW is larger than seven or not (step S72), and if LPOW is larger than 7, the power code LPOW is set to be seven (step S73). Then, the gain of the gain change part 255 (FIG. 4) is changed according to LPOW (step S74), and the flow returns to the main flow.

Figure 24A:
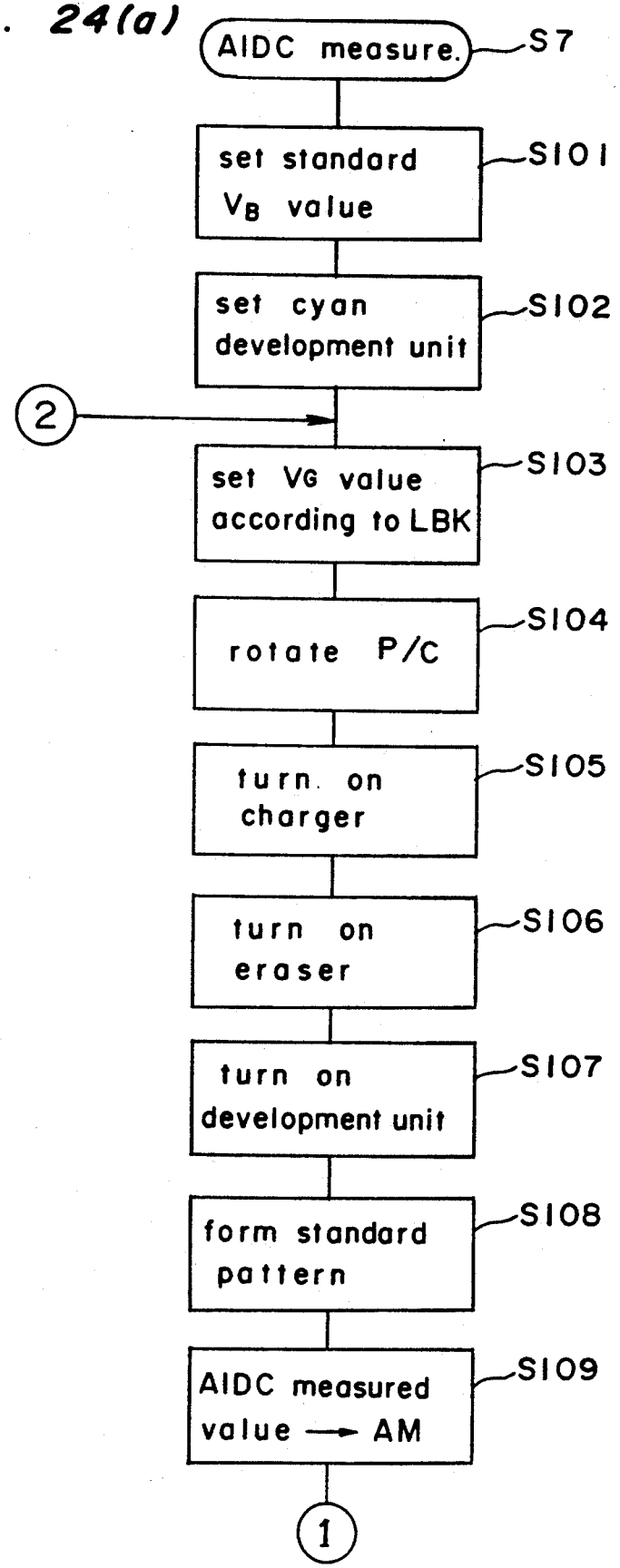

FIG. 24 shows the flow of the AIDC measurement processing (step S7). First, a standard value is set for the bias electric potential $V_B$ (step S101). Next, the cyan development unit 45a of the development color under printing is set (step S102).

After a $V_G$ value in correspondence with LBKC, LBKM, LBKY or LBKK of the development color under printing is set (set S103), the photoconductor drum 51 is rotated (step S104), the sensitizing charger 43 is turned on (step S105), the eraser lamp 42 is turned on at an output level read from the data ROM 203 corresponding to the $V_G$ (step S106), the development unit 45 for the measurement is turned on (step S107), and a standard pattern for the AIDC measurement is formed on the photoconductor (step S108). In the formation of the standard pattern (step S108), the output power of the laser diode 264 is controlled according to the set values of ($V_G$, $V_B$), as explained in (e-2). Then, the AIDC sensor 210 detects the amount of the adhered toners of the standard toner image, and the detection value is stored as AM in the data ROM 203 (step S109).

Next, the kind of the development unit to be set is decided. If it is decided that the cyan development unit 45a is set (YES at step S111), the detection value AM is stored as LBAC (step S112). Next, the formation of the standard image is stopped (step S113), and the magenta development unit 45b is set (step S114). Then, the flow returns to step S103 in order to continue the measurement.

If it is decided that the magenta development unit 45b is set (YES at step S121), the detection value AM is stored as LBAM (step S122). Next, the formation of standard image is stopped (step S123), and the yellow development unit 45c is set (step S124). Then, the flow returns to step S103 in order to continue the measurement.

If it is decided that the yellow development unit 45c is set (YES at step S131), the detection value AM is stored as LBAY (step S132). Next, the formation of the standard image is stopped (step S133), and the black development unit 45d is set (step S134). Then, the flow returns to step S103 in order to continue the measurement.

If it is decided that the black development unit 45d is set (NO at steps S111, S121, and S131), the detection value AM is stored as LBAK (step S141). Next, the formation of the standard image is stopped (step S142). Then, the flow returns to the main program.

Figure 25:
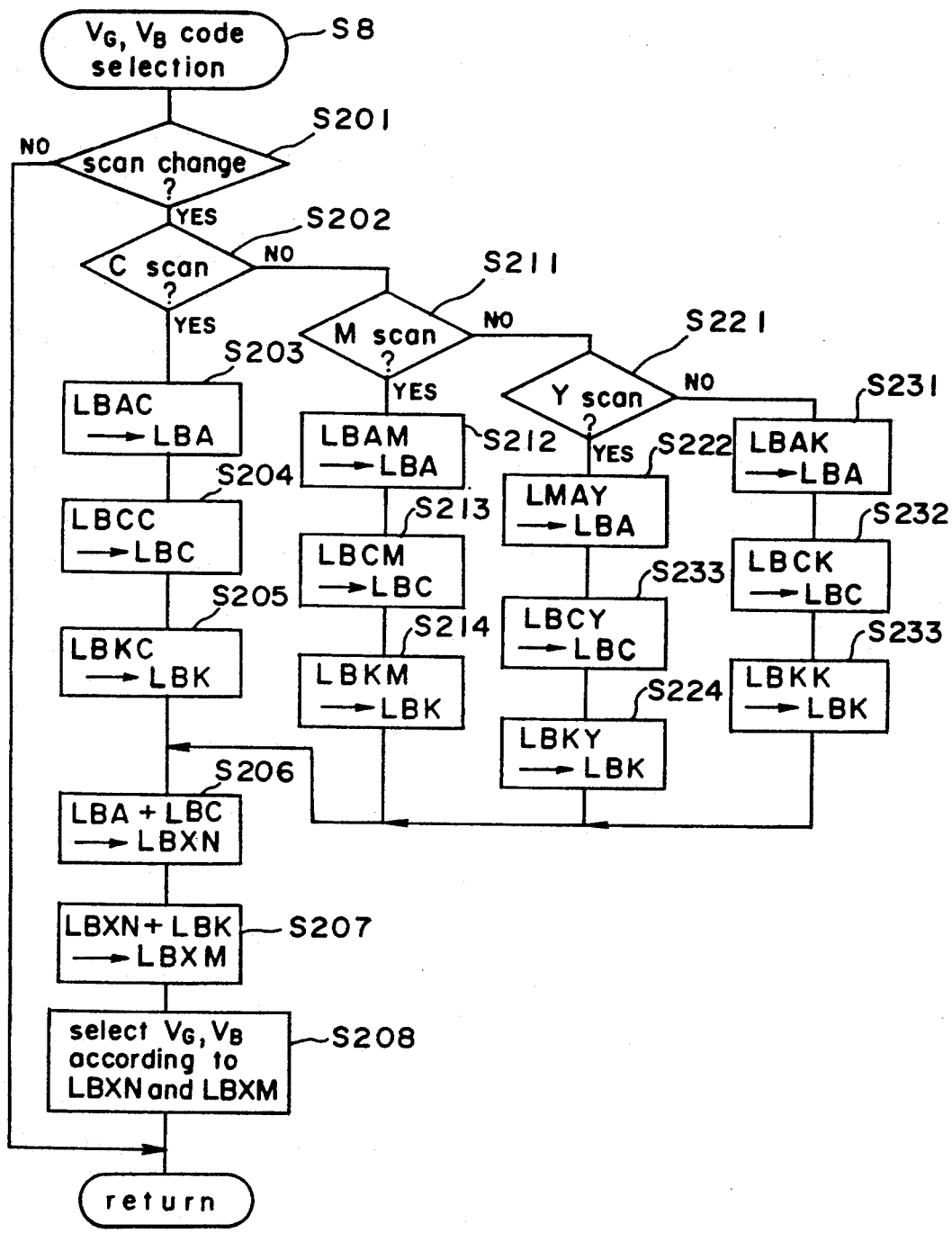
FIG. 25 is a flowchart of $V_G$, $V_B$ code selection processing.

FIG. 25 shows the flow of $V_B$, $V_G$ code selection processing (step S8). First, it is decided if a scan is changed or not (step S201). If the scan is not changed, the flow returns to the main program.

If the scan is decided to be changed to cyan scan for the print of cyan color (YES at step S202), the AIDC measurement value LBAC is stored as the detection level LBA (step S203), the color balance input value LBCC received from the color balance switch 216 is stored as the color bias level LBC (YES at step S204), and the fog input value LBKC received from the fog input switch 214 is stored as the fog elimination level LBK (step S205). Then, the flow proceeds to step S206.

Similarly, if the scan is decided to be changed to magenta scan (YES at step S211), the AIDC measurement value LBAM is stored as the detection level LBA (step S212), the color balance input value LBKM is stored as the color bias level LBC (step S213), and the fog input value LBKM is stored as the fog elimination level LBK (step S214). Then, the flow proceeds to step S206.

Similarly, if the scan is decided to be changed to yellow scan (YES at step S221), the AIDC measurement value LBAY is stored as the detection level LBA (step S222), the color balance input value LBKY is stored as the color bias level LBC (step S223), and the fog input value LBKY is stored as the fog elimination level LBK (step S224). Then, the program proceeds to step S206.

Similarly, if the scan is found to be changed to black scan (NO at steps S202, S211 and S221), the AIDC measurement value LBAY is stored as the detection level LBA (step S231), the color balance input level value LBCK is stored as the color bias level LBC(YES at step S232), and the fog input value LBKK is stored as the fog elimination level LBK (step S233). Then, the program proceeds to step S206.

Next, the detection level LBA and the color balance bias level LBC determined as explained above is added and the result is stored as the corrected detection level LBXN which corresponds to a bial electric potential value $V_B$ (step S206). Then, the corrected detection level LBXN and the fog input level LBK are added and the result is stored as the level LBXM (step S207). In this flow, the difference of $V_G$ between the fog elimination levels LBK is made equal to that between the corrected detection level LBXN, so that the sum of the two levels, LBXM, corresponds to a grid electric potential value $V_G$. Therefore, the bias electric potential $V_B$ corresponding to the corrected detection level LBXN is set, and the grid electric potential $V_G$ corresponding to the level LBXM is set (step S208). Then, the flow returns to the main flow. Thus, $V_G$ and $V_B$ are selected by taking into account the color balance and the fog elimination to be set by an operator. If the above-mentioned two differences of $V_G$ are made different from each other as shown in Table 1, $V_G$ can be made to correspond with a matrix of (LBXN, LBK).

Figure 26:
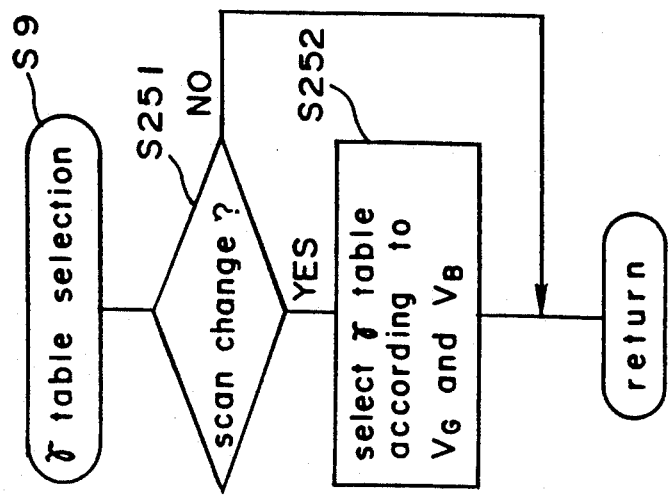
FIG. 26 is a flowchart of gamma correction table selection processing.

FIG. 26 shows the flow of the gamma table selection processing (step S9). First, it is decided if the scan is changed or not (step S251). If the scan is changed, a gamma correction table is selected according to the set values of $V_G$ and $V_B$ (step S252). Then the flow returns to the main flow.

In a modified embodiment explained in section (d-5) wherein ($V_G$, $V_B$) are selected according to $\beta$ code, a gamma correction table is selected according to the $\beta$ code at Step S252. In another modified embodiment explained in section (d-4) wherein a table for addition correction is used, a gamma correction table is selected according to the grid electric potential $V_B$ and a table for addition correction is selected according to the fog elimination level LBK at step S252.

The gamma correction table selected as explained above is read at the print action (FIG. 20 step S10) in order to transform an input level (OD) to an output level.

(g) automatic fog elimination

In the above-mentioned embodiments, an operator can set the fog elimination level with the fog input switch 214 manually after seeing an image reproduced. However, if the fog elimination level can be set automatically, it becomes easier to use a printer. In a modified embodiment to be explained below, the fog elimination level (LBK) of four steps 0-3 is determined automatically by detecting the amount of fog of the development unit 45a-45d with the AIDC sensor 210, so that the grid electric potential $V_G$ which can eliminate fog can be selected according to the fog elimination level.

Figure 27:
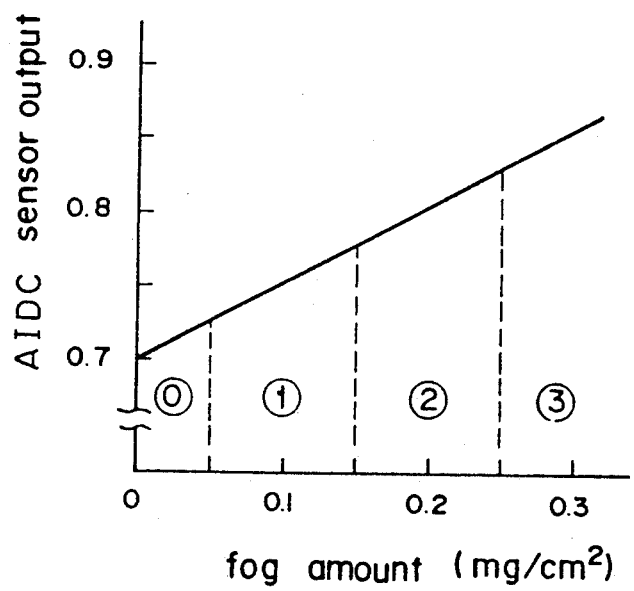
FIG. 27 is a graph of the setting of fog elimination level.

In order to detect the amount of fog, at the same time as the formation of a standard toner image for the detection of the adhered amount of toners with the AIDC sensor 210, a second standard toner image is formed on the photoconductor in an area different from the area for the first standard toner image for the detection of AIDC level. The second standard toner image is formed by exposing the photoconductor with a predetermined very weak light-emitting intensity (for example, the minimum light-emitting intensity of the laser diode 264), and the AIDC sensor 210 also detects the adhered amount, fog amount, of toners of the second standard image. As shown in FIG. 27, the detection value $V_{AIDC}$ of the AIDC sensor varies with the fog amount. Then, the detection value of the adhered amount of toner is classified for example into four sections 0-3, and each section is made to correspond a fog elimination level 0-3. Then, by using the detection value $V_{AIDC}$ for each color, the fog elimination level LBK can be determined automatically.

Thus, the AIDC sensor 210 can be used for two applications efficiently, and fog can be eliminated automatically while keeping the gradation characteristic constant. Then, an image of good quality can be reproduced stably. Further, the life time of toners, the photoconductor or the like can be made longer because fog can be eliminated, so that the running cost of a printer can be lowered.

In this modified embodiment, the fog elimination level (LBK) is set automatically, the fog input switch 214 (FIG. 2) is not necessary in the control system, and the processing of the fog input switches S56-S59 (FIG. 22) also becomes unnecessary in the switch input processing of the print controller 201. On the other hand, the processing for measuring the fog value automatically is needed in the AIDC measurement processing (step S7). No other points are changed in the flow of the print control. The changed flows are explained below.

Figure 28:
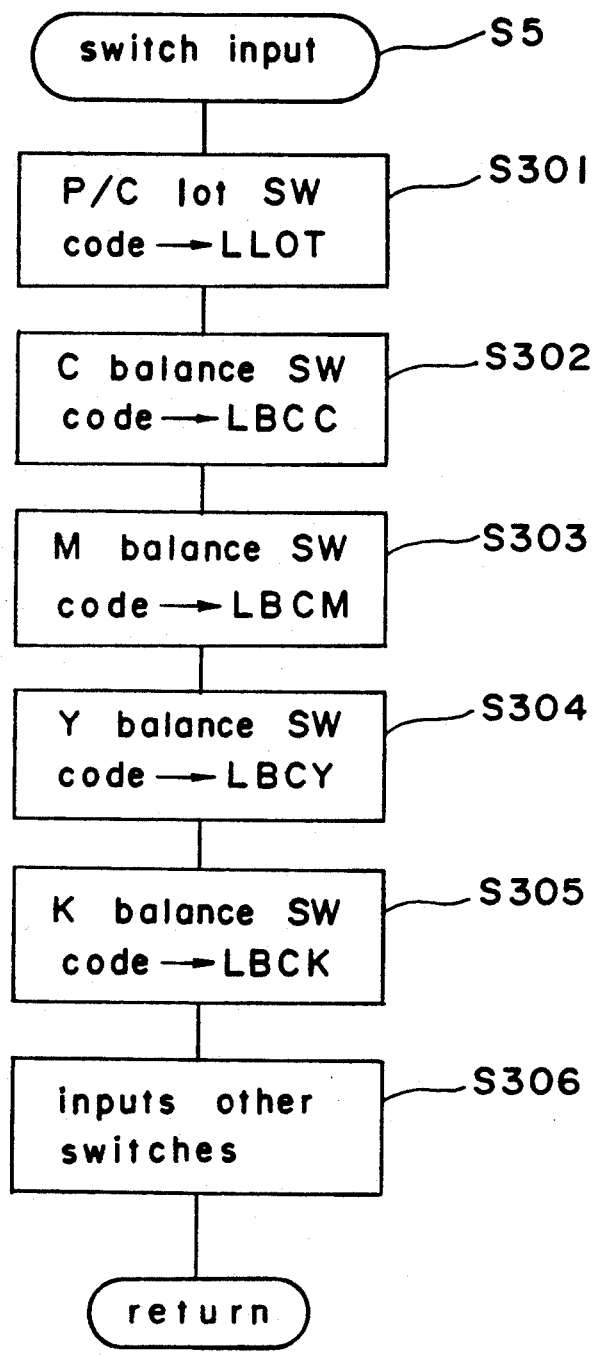
FIG. 28 is a flowchart of switch input processing of a modified embodiment.

FIG. 28 shows the flow of the switch input processing (step S5). First, the photoconductor lot switch code is received from the P/C lot switch (a 3-bit DIP switch) to be stored in the data ROM 203 as the photoconductor lot code LLOT (step S301). This code may also be inputted by reading a mark such as a bar code put on the photoconductor drum 41. Next, color balance switch codes of cyan (C), magenta (M), yellow (Y) and black (K) are received from the color balance switches 216 of each color, and are stored as codes LBCC, LBCM, LBCY and LBCK (step S302-S305). Next, switch inputs of other switches are received, and stored (step S306). Then, the flow returns to the main flow.

Figure 29A:
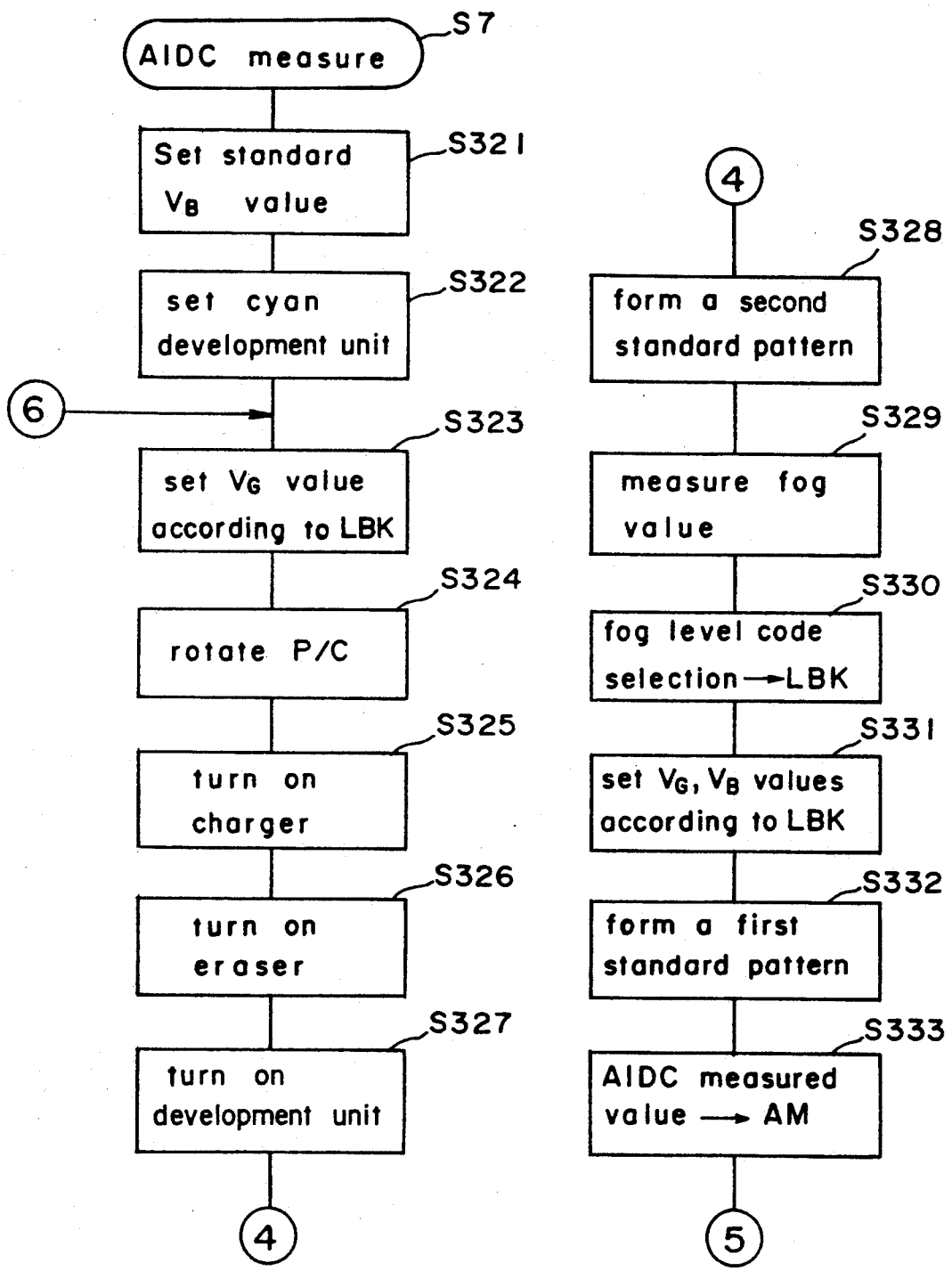
FIGS. 29(a) and 29(b) flowcharts of AIDC measurement processing of the modified embodiment.
Figure 29B:
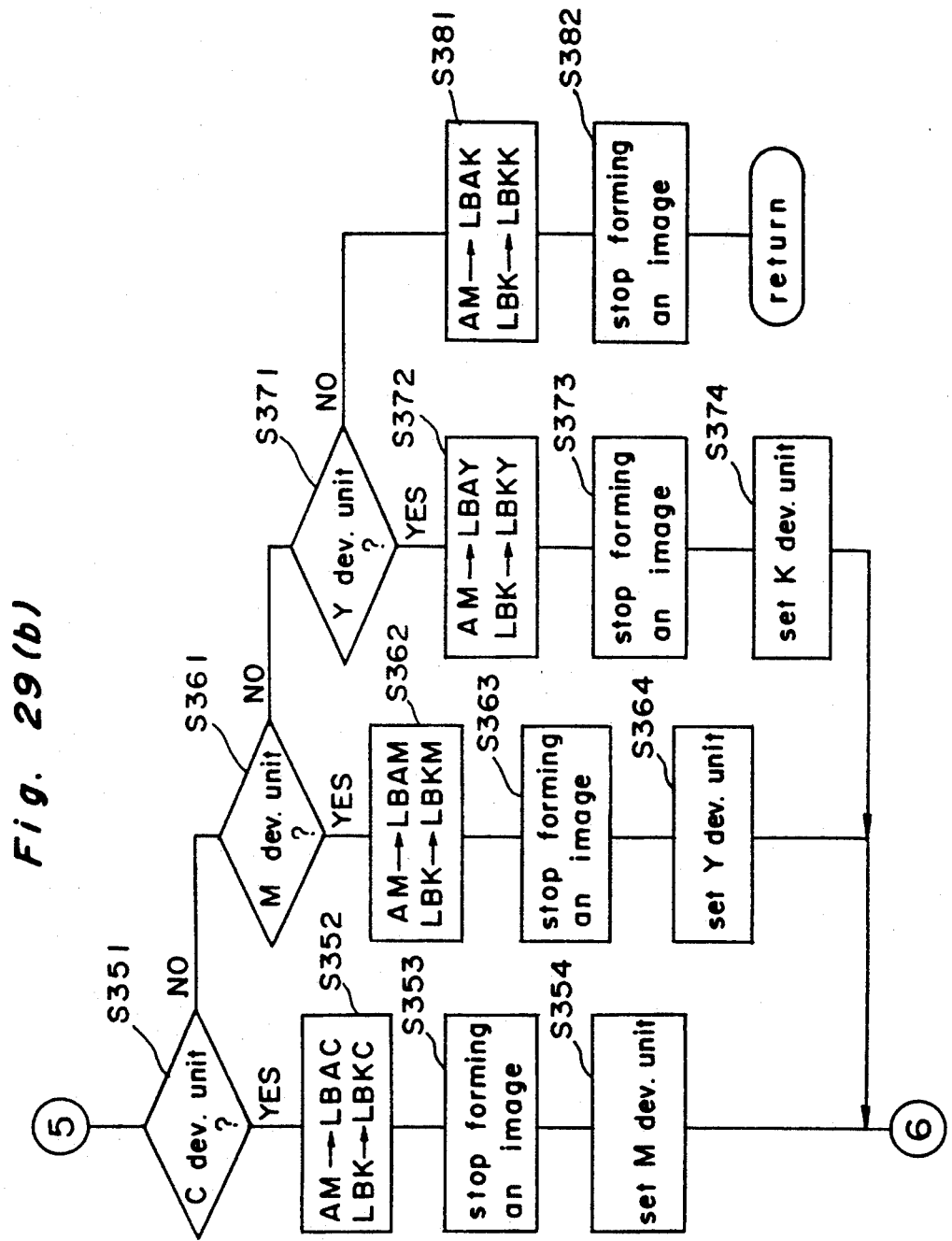

FIG. 29 shows the flow of the AIDC measurement processing (step S7). First, a standard value is set for the bias electric potential $V_B$ (step S321). Next, the cyan development unit 45a of the development color under printing is set (step S322).

After, a $V_G$ value in correspondence with LBKC, LBKM, LBKY or LBKK of the development color under printing is set (set S323), the photoconductor drum 51 is rotated (step S324), the sensitizing charger 43 is turned on (step S325), the eraser lamp 42 is turned on at an output level S325), the eraser lamp 42 is turned on at an output level read from the data ROM 203 corresponding to the $V_G$ (step S326), the development unit 45 for the measurement is turned on (step S327), and a second detection pattern for the fog measurement is formed on the photoconductor (step S328). In the formation of the standard pattern (step S328), the output power of the laser diode 264 is controlled according to the set values of ($V_G$, $V_B$) as explained in (e-2). Then, the AIDC sensor 210 detects the fog amount of the adhered toners of the second standard toner image (step S329), and fog level code is selected from the detection value and its is stored as LBK in the data ROM 203 (step S330).

Next, $V_G$ and $V_B$ are set for the AIDC measurement according to the LBK value (step S331). Then, a first standard toner image for the AIDC measurement is formed on the photoconductor (step S332), and the obtained AIDC value is stored as AM in the data ROM 203 (step S333).

Then, the kind of the development unit to be set is decided. If it is decided that the cyan development unit 45a is set (YES at step S351), the detection value AM is stored as LBAC and the LBK data is stored as LBKC (step S352). Next, the formation of the standard image is stopped (step S353), and the magenta development unit 45b is set (step S354). Then, the flow returns to step S323 in order to continue the measurement.

If it is decided that the magenta development unit 45b is set (YES at step S361), the detection value AM is stored as LBAM and the LBK data is stored as LBKM (step S362). Next, the formation of standard image is stopped (step S363), and the yellow development unit 45c is set (step S364). Then, the flow returns to step S323 in order to continue the measurement.

If it is decided that the yellow development unit 45c is set (YES at step S371), the detection value AM is stored as LBAM and the LBK data is stored as LBKY (step S372). Next, the formation of the standard image is stopped (step S373), and the black development unit 45d is set (step S374). Then, the flow returns to step S323 in order to continue the measurement.

If it is decided that the black development unit 45d is set (NO at steps S351, S361 and S371), the detection value AM is stored as LBAK and the LBK data is stored as LBKK (step S381). Next, the formation of the standard image is stopped (step S382). Then, the flow returns to the main program.

(h) gradation correction for the pulse width modulation method

In the light-intensity modulation method which are explained above, the gradation is expressed by modulating the light intensity of the laser beam for exposure while keeping the area of a dot the same. On the other hand, in the pulse width modulation method, the gradation is expressed by modulating the pulse width or the area of one dot while keeping the light intensity of laser beam constant.

FIG. 30 shows the comparison of gradation characteristics of various gradation expression methods. It is found that linearity of the gradation characteristic of the dither method (4×4) without using multi-level values is good essentially. The gradation characteristic of the pulse width modulation method (2-dot period) is not so nonlinear as that of the light-intensity modulation method. However, the nonlinearity of the gradation characteristic of the pulse width modulation method has also to be corrected.

Figure 31:
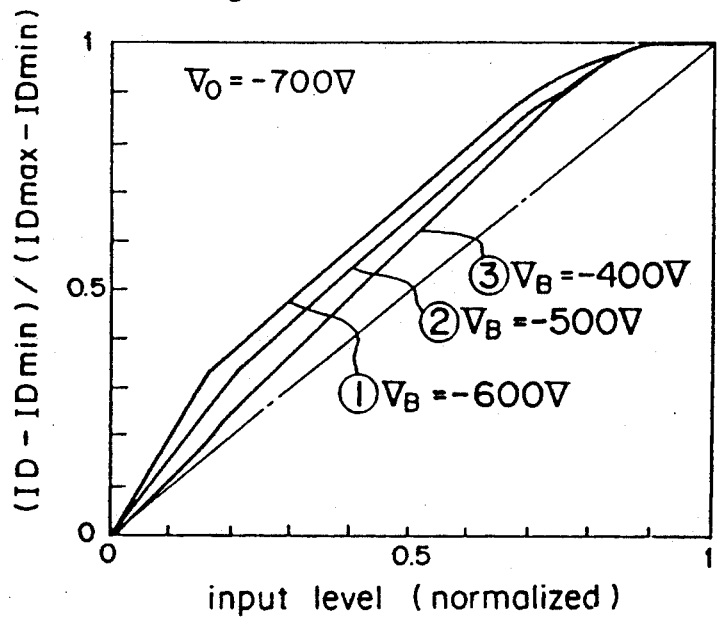
FIG. 31 is a graph of the gradation characteristic of the pulse width modulation method.

FIG. 31 shows the gradation characteristic of the pulse width modulation method (2-dot period, 400 dots per inch), wherein the bias electric potential $V_B$ is changed to be $-600V$, $-500V$, and $-400V$. That is $\beta = (V_B - V_I)/(V_O - V_I)$ is changed to be 0.833, 0.667, and 0.500, while keeping the surface electric potential $V_B(= -700V)$ constant. This changes also the deposition voltage ($|V_B - V_O|$) of the minimum dot portion, so that the gradation characteristic changes at low density so as to shift the entire shape.

Figure 32A:
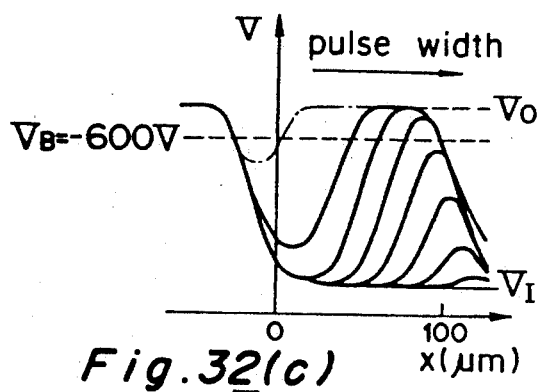
FIGS. 32(a), 32(b) and 32(c) are model diagram of the electrostatic latent image of the pulse width modulation method.
Figure 32B:
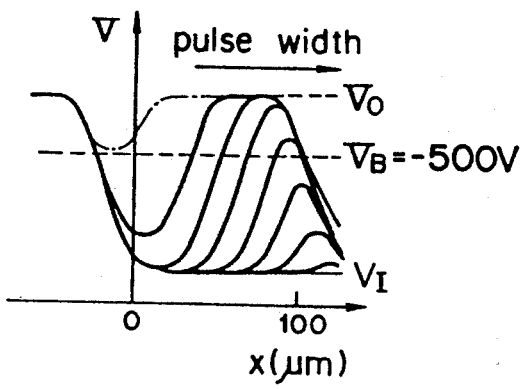
Figure 32C:
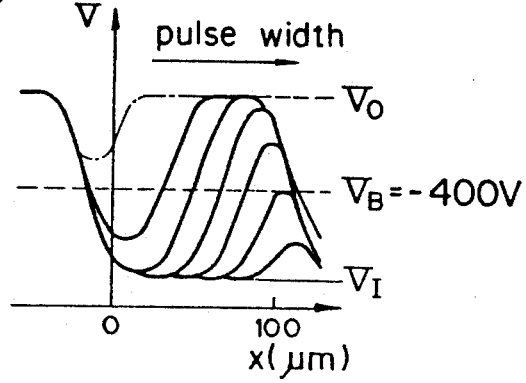

FIGS. 32(a), 32(b) and 32(c) show a model diagram of electrostatic latent image when the bias electric potential $V_B$ changes. Solid lines displays the change of the electrostatic latent image (decay electric potential). On the other hand, the bias electric potential $V_B$ changes similarly to curves 1, 2, and 3 in FIG. 31. Therefore, the adherence of toners are hindered when the pulse width is small or the dot size is small. For example, when the pulse width is small so that the electric potential decays from the surface electric potential $V_O(= -700 V)$, toners are adhered in case (a), but not in cases (b) and (c). Thus, it is understood that fog can be eliminated by changing the bias electric potential $V_B$. Then, at low densities as shown in FIGS. 32(a)-32(c), the gradation characteristic is caused to change.

Therefore, the automatic density control and the fog elimination can be performed at the same time also in the pulse-width modulation method by changing the bias electric potential $V_B$ while keeping the grid electric potential $V_G$ constant. Similarly, fog can be eliminated by adjusting $V_G$ while keeping $V_B$ constant. Further, in general, the automatic density modulation and the fog elimination can be performed by changing a combination of $V_B$ and $V_G$, similarly to as in the light-intensity modulation method.

Figure 33:
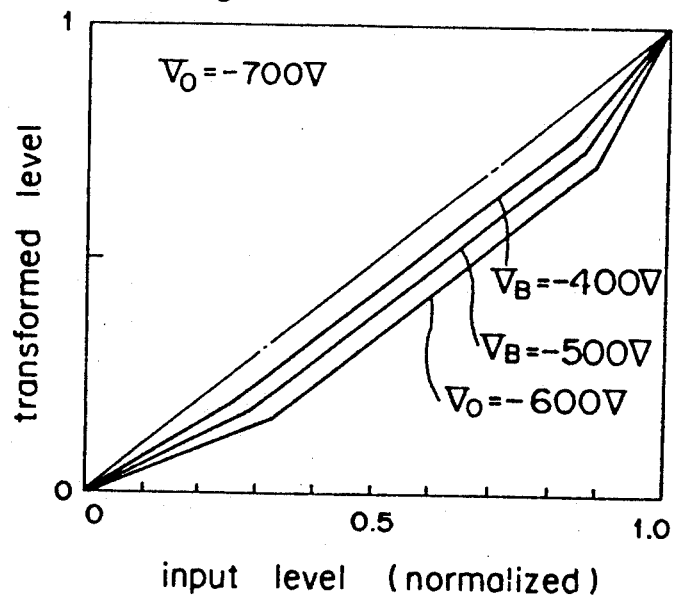
FIG. 33 is a graph of the gradation characteristic of the pulse width modulation method.

FIG. 33 shows gradation correction curves in correspondence with the gradation characteristics shown in FIG. 31. Thus, gamma correction tables corresponding to these curve have to be stored in the data ROM 203. If a gamma correction table is prepared for each pair of ($V_G$, $V_B$) as in case of the light-intensity modulation method, the gradation correction is performed as well as the automatic density control and the fog elimination. If the gradation correction curve is approximated by a broken line, the memory capacity can be decreased. It is also possible to define $\beta$ code in correspondence with a parameter $\beta = (V_B - V_I)/(V_O - V_I)$, and to determine $\beta$ code according to ($V_G$, $V_B$). Then, a gamma correction table most suitable to the $\beta$ code can be selected. Thus, the number of gamma correction data decreases and the memory capacity of the data ROM 203 can be decreased.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An apparatus for forming an image with use of an electrophotographic process, comprising:
   (a) a photoconductor layer;
   (b) a charger which sensitizes said photoconductor layer at a desired initial electric potential;
   (c) exposure means for exposing the sensitized photoconductor layer to form an electrostatic latent image;
   (d) a development device which develops the electrostatic latent image to form a toner image;
   (e) application means for applying a bias electric voltage to said development device;
   (f) detection means for detecting the state of the surface of said photoconductor layer;
   (g) determination means for determining the values of the initial electric potential and the bias electric voltage in correspondence with the results detected by said detection means;
   (h) charger control means for controlling said charger so that the initial electric potential of said photoconductor layer becomes the value determined by said determination means;
   (i) bias control means for controlling said application means so as to make said bias electric voltage to become the value determined by said determination means;
   (j) operation means for inputting data by an operator; and
   (k) correction means for controlling said charger and/or said application means so as to increase or decrease the value of the initial electric potential set by said charger control means and/or the value of the bias electric voltage set by said bias control means in correspondence with the data set by said operation means.

2. An apparatus according to claim 1, wherein said state detected by said detection means is the image density of a toner image formed on said photoconductor layer.

3. An apparatus for forming an image with use of an electrophotographic process, comprising:
   (a) a photoconductor layer;
   (b) a charger which sensitizes said photoconductor layer at a desired initial electric potential;
   (c) exposure means for exposing the sensitized photoconductor layer to form an electrostatic latent image;
   (d) a development device which develops the electrostatic latent image to form a toner image;
   (e) application means for applying a bias voltage to said development device;
   (f) exposure control means for controlling said exposure means to form a standard image on said photoconductor layer;
   (g) detection means for detecting the density of said standard toner image formed on said photoconductor layer;
   (h) operation means for inputting an adjustment signal to be used to adjust the density of an image to be formed; and (i) control means for controlling said charger and/or said application means according to the density of said standard toner image detected by said detection means and said adjustment signal inputted by using said input means.

4. An apparatus for forming a multi-color image with use of electrophotographic process, comprising:
  (a) a photoconductor layer;
  (b) a charger which sensitizes said photoconductor layer at a desired initial electric potential;
  (c) exposure means for exposing the sensitized photoconductor layer to form an electrostatic latent image;
  (d) a plurality of development devices each including toners of a color different to each other to develop the electrostatic latent image formed on said photoconductor layer;
  (e) application means for applying a bias electric voltage to each development devices;
  (f) transfer means for transferring a toner image to a paper, which toner image having been formed on said photoconductor layer by said plurality of development devices;
  (g) means for forming a plurality of standard images each of a different color on said photoconductor layer;
  (h) detection means for detecting the densities of said plurality of standard images;
  (i) operation means for inputting values by an operator; and
  (j) control means for controlling the initial electric voltage and/or the bias electric voltage in correspondence with the results detected by said detection means and the values inputted by using said operation means so as to change the color balance of a multi-color image to be formed on the paper.

5. An apparatus for forming a multi-color image with use of electrophotographic process, comprising:
  (a) a photoconductor layer;
  (b) a charger which sensitizes said photoconductor layer at a desired initial electric potential;
  (c) exposure means for exposing the sensitized photoconductor layer to form an electrostatic latent image;
  (d) a plurality of development devices each including toners of a color different to each other to develop the electrostatic latent image formed on said photoconductor layer;
  (e) application means for applying a bias electric voltage to each development devices;
  (f) transfer means for transferring a toner image to a paper, which toner image having been formed on said photoconductor layer by said plurality of development devices;
  (g) operation means for inputting values by an operator;
  (h) control means for controlling the initial electric potential and/or the bias electric voltage in correspondence with the values inputted by using said operation means so as to changed the color balance of a multi-color image to be formed on the paper.

6. An apparatus for forming an image with use of electrophotographic process, comprising:
  (a) a photoconductor layer;
  (b) a charger which sensitizes said photoconductor layer at a desired initial electric potential;
  (c) exposure means for exposing the sensitized photoconductor layer to form an electrostatic latent image;
  (d) a development device which develops the electrostatic latent image formed on said photoconductor layer to form a toner image;
  (e) application means for applying a bias electric voltage to said development device;
  (f) detection means for detecting the density of the toner image formed on said photoconductor layer;
  (g) determination means for determining the values of the initial electric potential and the bias electric voltage according to the results detected by said detection means;
  (h) control means for controlling said charger so as to make the initial electric potential of said photoconductor layer the value determined by said determination means and for controlling said application means so as to make the bias electric voltage the value determined by said determination means; and
  (i) input means for inputting a fog elimination signal; wherein when a fog elimination signal is inputted by said input means, said control means controls said charger so as to change the initial electric potential according to the fog elimination signal while controlling said application means so as to keep the bias electric voltage the value determined by said determination means.

7. An apparatus according to claim 6, further comprising:
  exposure control means for controlling the intensity of light exposed to said photoconductor by said exposure means according to an image density signal representing the density of each pixel of an image to be formed;
  memory means for storing a plurality of gradation correction data which correspond with various combinations of the initial electric potential and the bias electric voltage; and
  selection means for selecting gradation correction data in correspondence with the bias electric voltage determined by said determination means and the initial electric potential corrected by said control means; wherein said exposure control means control the intensity of light according to the gradation correction data selected by said selection means.

8. An apparatus according to claim 7, wherein said exposure control means control the exposure time of said exposure means for each pixel according to the image density signal.

9. An apparatus according to claim 7, wherein said exposure control means controls said exposure means so that the area of a part to be exposed in correspondence with said each pixel on said photoconductor layer in correspondence with the image density signal.

10. An apparatus according to claim 7, wherein said exposure control means controls said exposure means so that the light intensity is controlled on the basis of the image density signal.

11. An apparatus according to claim 7, wherein each of said plurality of gradation correction data includes an approximate formula of a gradation correction curve, and said exposure control means include means for calculating the light intensity according to the image density signal and the approximate formula included in the gradation correction data to be selected.

12. An apparatus for forming an image with use of electrophotographic process, comprising:

(a) a photoconductor layer;
(b) a charger which sensitizes said photoconductor layer at a desired initial potential;
(c) exposure means for exposing said photoconductor layer sensitized at the initial electric potential to form an electrostatic latent image;
(d) a developer device which can develop the electrostatic latent image formed on said photoconductor layer to form a toner image;
(e) application means for applying a bias electric voltage to the development device;
(f) first forming means for controlling said charger, said exposure means, said developement device, and said application means so as to form a first standard image on said photoconductor layer;
(g) second forming means for controlling said charger, said exposure means, said development means and said application means so as to form a second standard image on said photoconductor layer, which second standard image having a density different from that of the first standard image;
(h) detection means for detecting the density of the toner image formed on said photoconductor layer;
(i) determination means for determining the value of the bias electric voltage according to the density of the second standard image detected by said detection means, and for determining the value of the initial electric potential according to the first and second standard images detected by said detection means; and
(j) control means for controlling said charger so that the initial electric potential becomes the value determined by said determination means, and for controlling said application means for controlling so that the bias electric voltage becomes the value determined by said determination means.

13. An apparatus according to claim 12, wherein an apparatus according to claim 6, further comprising:
exposure control means for controlling the intensity of light exposed to said photoconductor by said exposure means according to an image density signal representing the density of each pixel of an image to be formed;
memory means for storing a plurality of gradation correction data which correspond with various combinations of the initial electric potential and the bias voltage; and
selection means for selecting a gradation correction data in correspondence with the bias electric voltage determined by said determination means and the initial electric potential corrected by said control means; wherein said exposure control means control the intensity of light according to the gradation correction data selected by said selection means.

14. An apparatus according to claim 13, wherein each of said plurality of gradation correction data includes an approximate formula of gradation correction curve, and said exposure control means include means for calculating the light intensity according to the image density signal and the approximate formula included in the gradation correction data to be selected.

15. An apparatus according to claim 12, wherein said second forming means controls said charger so that the initial electric potential for forming the second standard image becomes a value in correspondence with the density of the first standard image detected by said detection means.

16. An apparatus for forming an image with use of electrophotographic process, comprising:
(a) a photoconductor layer;
(b) a charger which sensitizes said photoconductor layer;
(c) exposure means for exposing said photoconductor layer sensitized at the initial electric potential to form an electrostatic latent image;
(d) exposure control means for controlling the intensity of light of exposure by said exposure means according to an image density signal representing the density of each pixel of an image to be formed;
(e) a development device which develops the electrostatic latent image, formed on said photoconductor layer, to form a toner image;
(f) application means for applying a bias voltage to the development device;
(g) density adjustment means for controlling said charger and/or said application means to change the initial electric potential and/or the bias voltage so as to adjust the density of each pixel;
(h) memory means for storing a plurality of gradation correction data; and
(i) selection for selecting one of the gradation correction data stored in said memory means according to the value of $(V_B - V_I)/(V_0 - V_I)$, wherein $V_B$ represents the bias electric voltage, $V_0$ the initial electric potential, and $V_I$ the surface electric potential of the photoconductor layer when the photoconductor layer is exposed at the light intensity in correspondence with the largest image density signal, wherein said exposure control means control said exposure means so as to expose said photoconductor layer at the light intensity according to the gradation correction data selected by said selection means.

17. An apparatus according to claim 16, wherein said density control means comprising:
(a) detection means for detecting the density of the toner image formed on said photoconductor layer;
(b) determination means for determining the values of the initial electric potential and the bias electric voltage according to the results detected by said detection means;
(c) control means for controlling said charger so as to make the initial electric potential of said photoconductor layer the value determined by said determination means and for controlling said application means so as to make the bias electric voltage the value determined by said determination means; and comprising further;
input means for inputting a fog elimination signal; wherein
said density control means adjust the value of the initial electric potential according to the fog elimination signal inputted by said input means while keeping the bias electric voltage as the value determined by said determination means.

18. An apparatus for forming an image with use of electrophotographic process, comprising:
(a) a photoconductor layer;
(b) a charger which sensitizes said photoconductor layer at a desired initial electric potential;
(c) exposure means for exposing the sensitized photoconductor layer to form an electrostatic latent image;

(d) a development device which develops the electrostatic latent image formed on said photoconductor layer to form a toner image;

(e) application means for applying a bias electric voltage to said development device;

(f) exposure control means for controlling said exposure means to expose said photoconductor layer at a predetermined light intensity so as to form a standard image on the photoconductor layer;

(g) detection means for detecting the density of the standard image formed on said photoconductor layer;

(h) density control means for controlling the density of an image to be formed according to the density of the standard image detected by said detection means;

(i) set means for setting the value of the initial electric potential when the standard image is formed; and (j) charger control means for controlling the charger so as to sensitize the photoconductor layer at the value set by said set means when the standard image is formed; wherein said exposure control means controls said exposure means so as to change the light intensity to form the standard image according to the value set by said set means.

19. An apparatus according to claim 18, wherein said density control means control the bias electric voltage.

20. An apparatus according to claim 18, further comprising operation means for inputting a fog elimination signal by an operator; wherein said set means changes the value of the initial electric potential, when the standard image is formed, according to the fog elimination signal inputted by the operation means.

21. An apparatus according to claim 20, further comprising means for initial electric potential control means for controlling said charger so as to adjust the initial electric potential according to the density of the standard image detected by said detection means and the fog elimination signal.

22. An apparatus for forming an image with use of electrophotographic process, comprising:

(a) a photoconductor layer;

(b) a charger which sensitizes said photoconductor layer at a desired initial potential;

(c) exposure means for exposing said photoconductor layer sensitized at the initial electric potential to from an electrostatic latent image;

(d) a developer device which develops the electrostatic latent image formed on said photoconductor layer to form a toner image;

(e) application means for applying a bias electric voltage to the developer device;

(f) first exposure control means for controlling the exposure means to expose said photoconductor layer at a first light intensity so as to form a first standard image;

(g) second exposure control means for controlling the exposure means to expose said photoconductor layer at a second light intensity different from the first light density so as to form a second standard image of a density different from that of the first standard image;

(h) detection means for detecting the densities of the first and second standard images formed on said photoconductor layer;

(i) initial electric potential set means for setting the initial electric potential, when the second standard image is formed, according to to the density of the first standard image detected by said detection means;

(j) charger control means for controlling the charger so as to sensitize the photoconductor layer at the value set by said initial electric potential set means when said second standard image is formed; and (k) density control means for controlling the density of an image to be formed on said photoconductor layer according to the density of the second standard image detected by said detection means; wherein said second exposure control means changes the light intensity for forming the second standard image according to the value set by said initial electric potential set means.

23. An apparatus according to claim 22, wherein said density control means control the bias voltage.

24. An apparatus according to claim 22, further comprising initial electric potential adjustment means for controlling said charger so as to adjust the initial electric potential according to the densities of the first and second standard images detected by said detection means.

25. An apparatus for forming an image with use of electrophotographic process, comprising:

(a) a photoconductor layer;

(b) a charger which sensitizes said photoconductor layer at a desired initial electric potential;

(c) exposure means for exposing said photoconductor layer sensitized at the initial electric potential to form an electrostatic latent image;

(d) exposure control means for controlling the intensity of light of exposure by said exposure means according to an image density signal representing the density of each pixel of an image to be formed;

(e) a development device which develops the electrostatic latent image, formed on said photoconductor layer, to form a toner image;

(f) application means for applying a bias voltage to the development device;

(g) detection means for detecting the density of the toner image formed on said photoconductor layer;

(h) determination means for determining the values of the initial electric potential and the bias electric voltage according to the results of the detection by said detection means;

(i) input means for inputting a fog elimination signal;

(j) adjustment means for adjusting the initial electric voltage, determined by said determination means, according to the fog elimination signal inputted by said input means;

(k) control means for controlling said application means so that the bias electric voltage becomes the value determined by said determination means, and for controlling said charger so that the initial electric potential of said photoconductor layer becomes the value adjusted by said adjustment means;

(l) first memory means for storing a plurality of gradation adjustment data in correspondence with various combinations of the initial electric potential and the bias electric voltage;

(m) first selection means for selecting a gradation adjustment data stored in said first memory means in correspondence with the bias electric voltage determined by said determination means and the initial electric potential;

(n) second memory means for storing a plurality of addition data in correspondence with the fog elimination means;

(o) second selection means for selecting an addition data stored in said second memory means in correspondence with the fog elimination signal inputted by said input means; and (p) addition means for adding the addition data selected by said second selection means and the gradation correction data selected by said first selection means; wherein said exposure control means controls the exposure means to change the light intensity of exposure according to the output value supplied from said addition means.

26. An apparatus for forming an image with use of electrophotographic process, comprising:

(a) a photoconductor layer;

(b) a charger which sensitizes said photoconductor layer at a desired initial electric potential;

(c) exposure means for exposing said photoconductor layer sensitized at the initial electric potential to form an electrostatic latent image;

(d) exposure control means for controlling the light intensity of exposure to said photoconductor layer according to an image density signal representing the density of each pixel of an image to be formed;

(e) a developer device which develops the electrostatic latent image formed on said photoconductor layer to form a toner image;

(f) application means for applying a bias electric voltage to the developer device;

(g) first forming means for controlling said charger, said exposure means, said developer device, and said application means so as to form a first standard image on said photoconductor layer;

(h) second forming means for controlling said charger, said exposure means, said developer means and said application means so as to form a second standard image on said photoconductor layer, which second standard image having a density different from that of the first standard image;

(i) first memory means for storing a plurality of gradation adjustment data;

(j) first selection means for selecting a gradation adjustment data stored in said first memory means according to the density of the second standard image detected by said detection means;

(k) second memory means for storing a plurality of addition data;

(l) second selection means for selecting an addition data stored in said memory means according to the density of the first standard image detected by said detection means; and (m) addition means for adding the addition data selected by said second selection means to the gradation adjustment data selected by said first selection means; wherein said exposure control means control the light intensity of exposure according to the output value of said addition means.

27. An apparatus for forming an image with use of electrophotographic process, comprising:

(a) a photoconductor layer;

(b) a charger which sensitizes said photoconductor layer at a desired initial electric potential;

(c) exposure means for exposing said photoconductor layer sensitized at the initial electric potential to form an electrostatic latent image;

(d) exposure control means for controlling the light intensity of exposure to said photoconductor layer according to an image density signal representing the density of each pixel of an image to be formed;

(e) a developer device which develops the electrostatic latent image formed on said photoconductor layer to form a toner image;

(f) application means for applying a bias electric voltage to the developer device;

(g) first forming means for controlling said charger, said exposure means, said developer device, and said application means so as to form a first standard image on said photoconductor layer;

(h) second forming means for controlling said charger, said exposure means, said developer means and said application means so as to form a second standard image on said photoconductor layer, which second standard image having a density different from that of the first standard image;

(i) detection means for detecting the density of the toner image formed on said photoconductor layer;

(j) determination means for determining the value of the bias electric voltage according to the density of the second standard image detected by said detection means, and for determining the value of the initial electric potential according to the density of the first and second standard images detected by said detection means;

(k) control means for controlling said charger and said application means so that the values of the initial electric potential and the bias electric voltage become the values determined by said determination means;

(l) first memory means for storing a plurality of gradation adjustment data;

(m) first selection means for selecting a gradation adjustment data stored in said first memory means according to the density of the second standard image detected by said detection means;

(n) second memory means for storing a plurality of addition data;

(o) second selection means for selecting an addition data stored in said memory means according to the density of the first standard image detected by said detection means; and (p) addition means for adding the addition data selected by said second selection means to the gradation adjustment data selected by said first selection means; wherein said exposure control means controls the light intensity of exposure according to the output value of said addition means.

28. An apparatus for forming an image with use of electrophotographic process, comprising:

(a) a photoconductor layer;

(b) a charger which sensitizes said photoconductor layer at a desired initial electric potential;

(c) conversion means for converting a digital signal to an analog signal, which digital signal representing the density of each pixel of an image to be formed;

(d) amplification means for amplifying the output signal of said conversion means at a gain;

(e) exposure means for exposing said photoconductor layer, sensitized at the initial electric potential at the light intensity of exposure according to a signal supplied from said amplification means to form an electrostatic latent image;

(f) a development device which develops said electrostatic latent image formed on said photoconductor layer to form a toner image;

(g) detection means for detecting the surface temperature of said photoconductor layer; and (h) change means for changing the gain of said amplification according to the surface temperature detected by said detection means.

29. An apparatus for forming an image with use of electrophotographic process, comprising:

(a) a photoconductor layer;

(b) a charger which sensitizes said photoconductor layer at a desired initial potential;

(c) exposure means for exposing said photoconductor layer sensitized at the initial electric potential to form an electrostatic latent image;

(d) a developer device which develops the electrostatic latent image formed on said photoconductor layer to form a toner image;

(e) exposure control means for controlling said exposure means to expose said photoconductor layer at a predetermined light intensity so as to form a standard image on said photoconductor layer;

(f) detection means for detecting the density of the standard image formed on the photoconductor layer;

(g) density control means for controlling the density of an image to be formed with use of electrophotographic process according to the density of the standard image detected by said detection means; and (h) condition detection means for detection an environment condition of said photoconductor layer;

wherein said exposure control means makes said exposure means change the light intensity to form the standard image according to the result of the detection by said condition detection means.

30. An apparatus according to claim 29, wherein said environment condition to be detected by said condition detection means is the surface temperature of said photoconductor layer.

31. An apparatus according to claim 29, wherein said density control means controls the density by controlling the bias electric voltage of the development device.

32. An apparatus for forming an image with use of electrophotographic process, comprising:

(a) a photoconductor layer;

(b) a charger which sensitizes said photoconductor layer at a desired initial electric potential;

(c) conversion means for converting a digital signal to an analog signal, which digital signal representing the density of each pixel of an image to be formed;

(d) amplification means for amplifying the output signal of said conversion means at a gain;

(e) exposure means for exposing said photoconductor layer, sensitized at the initial electric potential at the light intensity of exposure according to a signal supplied from said amplification means to form an electrostatic latent image;

(f) a development device which develops said electrostatic latent image formed on said photoconductor layer to form a toner image;

(g) exposure control means for controlling said exposure means to expose said photoconductor layer at a predetermined light intensity so as to form a standard image on said photoconductor layer;

(h) detection means for detecting the density of the standard image formed on the photoconductor layer;

(i) density control means for controlling the density of an image to be formed with use of electrophotographic process according to the density of the standard image detected by said detection means;

(j) set means for setting the value of the initial electric potential when the standard image is formed;

(k) charger control means for controlling the charger so that the photoconductor layer is sensitized at the value set by said set means when the standard image is formed;

(l) light intensity control means for supplying a digital signal to said conversion means when the standard image is formed, which digital signal corresponding to the value set by said set means;

(m) temperature detection means for detecting the surface temperature of said photoconductor layer when the standard image is formed; and (n) change means for changing the gain of said amplification means according to the surface temperature of said photoconductor layer detected by said temperature detection means.

33. An apparatus according to claim 32, wherein said light intensity control means, further comprising:

memory means for storing a plurality of standard light intensity data for forming the standard image;

selection means for selecting a standard light intensity data stored in said memory means according to the value set by said means; and supply means for supplying a digital signal in correspondence with the standard light intensity data selected by said selection means.

34. An apparatus according to claim 32, wherein said density control means control the density by controlling the bias electric voltage of the development device.

35. An apparatus according to claim 32, further comprising operation means for inputting a fog elimination signal by an operator; wherein said set means change the value of the initial electric potential, when the standard image is formed, according to the fog elimination signal inputted by said operation means.

36. An apparatus according to claim 32, further comprising adjustment means for controlling said charger so that the initial electric potential is adjusted according to the density of the standard image detected by said detection means and the fog elimination signal.

37. An apparatus for forming an image with use of electrophotographic process, comprising:

(a) a photoconductor layer;

(b) a charger which sensitizes said photoconductor layer at a desired initial electric potential;

(c) exposure means for exposing the sensitized photoconductor layer to form an electrostatic latent image;

(d) a development device which develops the electrostatic latent image formed on said photoconductor layer to form a toner image;

(e) application means for applying a bias electric voltage to said development device;

(f) exposure control means for controlling said control means to expose said photoconductor layer at a predetermined light intensity so as to form a standard image on the photoconductor layer;

(g) detection means for detecting the density of the standard image formed on said photoconductor layer;

(h) density control means for controlling the density of an image to be formed according to the density of the standard image detected by said detection means;

(i) set means for setting the value of the initial electric potential when the standard image is formed; and (j) charger control means for controlling the charger so as to sensitize the photoconductor layer at the value set by said set means when the standard image is formed; wherein said exposure control means controls said control means so as to charge the light intensity to form the standard image according to the value set by said set means; and (k) condition detection means for detecting a environment condition of said photoconductor plate; wherein said exposure control means control said exposure means so that the light intensity for forming the standard image is changed according to the result of the detection by said condition detection means and the value set by said set means.

38. An apparatus according to claim 37, wherein said environment condition to be detected by said condition detection means is the surface temperature of said photoconductor layer.

39. An apparatus according to claim 37, wherein said density control means control the density by controlling the bias electric voltage of the development device.

40. An apparatus for forming an image with use of electrophotographic process, comprising:

(a) a photoconductor layer;

(b) a charger which sensitizes said photoconductor layer at a desired initial electric potential;

(c) conversion means for converting a digital signal to an analog signal, which digital signal representing the density of each pixel of an image to be formed;

(d) amplification means for amplifying the output signal of said conversion means at a gain;

(e) exposure means for exposing said photoconductor layer, sensitized at the initial electric potential at the light intensity of exposure according to a signal supplied from said amplification means to form an electrostatic latent image;

(f) a development device which develops said electrostatic latent image formed on said photoconductor layer to form a toner image;

(g) first forming means for controlling said charger, said exposure means, said developer device, and said application means so as to form a first standard image on said photoconductor layer;

(h) second forming means for controlling said charger, said exposure means, said developer means and said application means so as to form a second standard image on said photoconductor layer, which second standard image having a density different from that of the first standard image;

(i) detection means for detecting the densities of the first and the second standard images formed on said photoconductor layer;

(j) first charger control means for controlling the charger so as to sensitize said photoconductor layer at a predetermined standard voltage when the first standard image is formed;

(k) first light intensity means for supplying a predetermined standard digital signal to said conversion means when the first standard image is formed;

(l) electric potential set means for setting the initial electric potential, when the second standard image is formed, according to the density of the first standard image detected by said detection means;

(m) second charger control means for controlling said charger so that said photoconductor layer is sensitized at a value set by said electric potential set means when the second standard image is formed;

(n) second light intensity control means for supplying a digital signal to said conversion means when the second standard image is formed, which digital signal corresponding to the value set by said electric potential set means; and (o) density control means for controlling the density of an image to be formed with use of electrophotographic process according to the density of the second standard image detected by said detection means.

41. An apparatus according to claim 40, further comprising:

means for detecting an environment condition of said photoconductor layer when the standard images are formed; and change means for changing the gain of said amplification means according to the result of the detection by said condition detection means.

42. An apparatus according to claim 41, wherein said environment condition to be detected by said condition detection means is the surface temperature of said photoconductor layer.

43. An apparatus according to claim 41, wherein said density control means controls the density by controlling the bias electric voltage of the development device.

44. An apparatus according to claim 40, further comprising adjustment means for controlling said charger to adjust the initial electric potential according to the first and the second standard images detected by said detection means.

* * * * *